United States Patent [19]
Imaizumi

[11] Patent Number: 5,968,438
[45] Date of Patent: *Oct. 19, 1999

[54] METHOD AND APPARATUS FOR PROCESSING A THINLY WALLED TUBE HAVING AN INWARDLY DIRECTED FLANGE SECTION

[75] Inventor: Yasuyuki Imaizumi, Koto-Ku, Japan

[73] Assignee: Yoshino Kogyosho Co., Ltd., Tokyo, Japan

[*] Notice: This patent is subject to a terminal disclaimer.

[21] Appl. No.: 08/981,230

[22] PCT Filed: Apr. 24, 1997

[86] PCT No.: PCT/JP97/01432

§ 371 Date: Dec. 19, 1997

§ 102(e) Date: Dec. 19, 1997

[87] PCT Pub. No.: WO97/39877

PCT Pub. Date: Oct. 30, 1997

[30] Foreign Application Priority Data

Apr. 24, 1996 [JP] Japan ................................ 8-102742

[51] Int. Cl.[6] .......................... B29C 57/00; B29C 57/12; B29C 61/02

[52] U.S. Cl. ......................... 264/296; 264/230; 264/322; 264/327; 425/384; 425/392; 425/393; 425/398

[58] Field of Search ..................................... 264/322, 327, 264/516, 519, 296, 230; 425/392, 393, 398, 525, 384

[56] References Cited

U.S. PATENT DOCUMENTS

| | | | |
|---|---|---|---|
| 3,570,107 | 3/1971 | Denzler Von Matt | 264/519 |
| 4,032,281 | 6/1977 | Rakovsky | 425/392 |
| 4,559,197 | 12/1985 | Dick et al. | 264/249 |
| 4,907,958 | 3/1990 | Jones | 425/384 |
| 5,069,856 | 12/1991 | Holoubek et al. | 264/519 |

FOREIGN PATENT DOCUMENTS 475126  3/1992  European Pat. Off. .

*Primary Examiner*—Jan H. Silbaugh
*Assistant Examiner*—Michael Poe
*Attorney, Agent, or Firm*—Oliff & Berridge, PLC

[57] ABSTRACT

A method and apparatus process a thinly walled tube of thermoplastic resin to produce a tubular container having an inwardly directed flange section in a hole formed at an end of the thinly walled tube. In a first step, the thinly walled tube is secured to a tube holder provided with a male mold for molding the flange section in the hole and forming an opening located inside the flange section. The front end of the thinly walled tube projects by a predetermined distance from the front end of the tube holder. Then, in a second step, hot air is blown to an inner wall surface of the thinly walled tube at and near the front end thereof and the outer wall surface of the thinly walled tube is cooled also at and near the front end thereof. This produces a temperature difference between an inside and an outside of the thinly walled tube, so as to deform the front end of the thinly walled tube into a flange projecting radially. When the inner wall surface is heated to a temperature lower than a melting point of the inner layer, the front end of the thinly walled tube is deformed inwardly. When the inner wall surface is heated to a temperature higher than the melting point of the inner layer, the front end of the thinly walled tube is deformed outwardly. Finally, in a third step, the deformed front end of the thinly walled tube is molded into the inwardly directed flange section having the opening located inside the flange section by means of a female mold cooperating with the male mold.

13 Claims, 19 Drawing Sheets

5,968,438

METHOD AND APPARATUS FOR PROCESSING A THINLY WALLED TUBE HAVING AN INWARDLY DIRECTED FLANGE SECTION

BACKGROUND OF THE INVENTION

This invention relates to a method and an apparatus for processing a thinly walled tube of thermoplastic resin to produce a tubular container having an inwardly directed flange section at an end of the thinly walled tube.

There are containers fabricated by applying a lid typically made of a filmy material to an end of a tube for each container. Such a container is normally used by peeling off the lid from the tube so that the content may be squeezed out. Of containers of the above described type, some are provided with an outwardly extending flange section arranged at an end of the tube, to which a lid is applied.

Generally, the process of manufacturing a tubular container made of a resin material and containing a given amount of a product comprises steps of preparing a tube main body from a thinly walled tube, filling it with the content and sealing the hole of the tubular container containing the contents typically by melting/bonding the open end of the container with heat or by means of an ultrasonic wave. In the above process, there are cases where tubes are laid flat in order to move the tubular container from a processing step to the next.

However, when tubes provided with the outwardly extending flange section are laid flat to transfer the tubular containers to the next processing station, there arises a problem that they rotate around the end opposite to the one where the flange section is arranged, so that the tubes would not be fed to the next processing step properly.

In view of the above identified problem, it is therefore the object of the present invention to provide a method and an apparatus for processing a thinly walled tube efficiently that is adapted to transfer it from a processing step to the next when it is held to a flatly laid state.

SUMMARY OF THE INVENTION (1) According to the invention, the above problem is remedied by providing a method for processing a thinly walled tube of thermoplastic resin to produce a tubular container having an inwardly directed flange section arranged along the periphery of the hole at an end of the thinly walled tube, comprising:

(A) a first step of securing the thinly walled tube to a tube holder provided with a male mold for molding the flange section having a hole and forming an opening located inside the flange section, the front end of the thinly walled tube being arranged to project by a predetermined distance from a front end of the tube holder;

(B) a second step of blowing hot air to an inner wall surface of the thinly walled tube at and near the front end thereof and cooling an outer wall surface of the thinly walled tube also at and the front end thereof, to produce a temperature difference between an inside and an outside of the thinly walled tube, so as to deform the front end of the thinly walled tube into a flange projecting radially; and (C) a third step of molding the inwardly deformed front end of the thinly walled tube into the flange section showing a predetermined shape and forming an opening located inside the flange section by means of a female mold cooperating with said male mold.

In the first embodiment of the invention, hot air is blown to the inner wall surface at and near the end of the thinly walled tube to heat the inner wall surface to a temperature lower than a melting point of the inner layer of the tube, while the outer wall surface of the thinly walled tube is cooled at and near the end, to produce the temperature difference between the inside and the outside of the thinly walled tube in the above described second step, so as to deform the front end of the thinly walled tube into a flange section projecting radially inwardly.

In the above described first embodiment of the invention, it is considered that because hot air is blown to the inner wall surface of the thinly walled tube from the inside to heat the inner wall surface to a temperature lower than the melting point of the inner layer of the tube, the inner wall surface is heated above the glass transition point thereof, so that it instantaneously contracts to restore the original shape according to its memory, whereas the outer wall surface does not contract at all due to its memory, because it is cooled, so that consequently the end of the thinly walled tube can be deformed inwardly. Then, an inwardly projecting flange section is formed at the end of the thinly walled tube and the opening is made to maintain a predetermined shape as a cooperative effect of the male and female molds.

In the second embodiment of the invention, hot air is blown to the inner wall surface at and near the end of the thinly walled tube to heat the inner wall surface to a temperature higher than the melting point of the inner layer of the tube, while the outer wall surface of the thinly walled tube is cooled at and near the end, to produce a temperature difference between the inside and the outside of the thinly walled tube in the above described second step, so as to deform the front end of the thinly walled tube into a flange-like shape projecting radially outwardly. It is considered that because the inner wall surface of the thinly walled tube is heated to the temperature higher than the melting point of the inner layer of the tube, only the inner layer is molten and flows downward to become suspended, whereas the cooled outer layer does not melt, so that the inner layer is pulled and expanded toward the outside by the contracting force of the substance having the low melting point.

Then, the end of the thinly walled tube that has been deformed to project radially outwardly is then molded into the flange section showing a predetermined shape and an opening is formed inside the flange section by means of the male and female molds cooperating with each other. Firstly, hot air is further blown to the outer wall surface of the thinly walled tube at the outwardly deformed end thereof, so as to soften the outer wall surface at the end. Then, the end of the thinly walled tube is bent to the inside of the tube and folded on the adjacent portion of the tube. Thereafter, the flange section having a predetermined shape and the opening located inside the flange section are formed at the folded end of the thinly walled tube by means of the male and female molds. Thus, as a cooperative effect of the male and female molds, the inwardly projecting flange section is molded with an opening that is made to maintain a predetermined shape.

(2) Preferably, the hot air used to heat the inner wall surface of the tube in said second step is forcibly drawn away from the tube holder.

By limiting the heated area at and near the end of the thinly walled tube, the adjacent area directly connected to the flange section is protected against undesired deformation.

(3) Preferably, the thinly walled tube has a three-layered structure including an outer layer, an inner layer and an intermediate layer sandwiched between the inner and outer layers, and the thermoplastic resin of the inner layer has a melting point lower than that of the thermoplastic resin of the intermediate layer.

(4) According to the invention, there is also provided an apparatus for processing a thinly walled tube of thermoplastic resin to produce a tubular container having an inwardly directed flange section arranged along the periphery of the hole at an end of the thinly walled tube, comprising a tube holder for holding said thinly walled tube, a heater/cooler and a female mold, wherein (A) said tube holder has a male mold to be inserted into the thinly walled tube held by the tube holder for compression molding, said male mold being arranged axially inwardly relative to the end of the thinly walled tube by a given distance, and axially movable;

(B) said heater/cooler is adapted to blow hot air to the inner wall surface of said thinly walled tube at the end thereto, while cooling the outer wall surface of the thinly walled tube; and (C) said female mold is adapted to mold the flange section in the hole of the thinly walled tube with an opening located inside the flange section as a cooperative effect of this female mold itself and the male mold of said tube holder.

The tube holder holds the thinly walled tube, and the end of the thinly walled tube is introduced into the heater/cooler by moving the tube holder holding the thinly walled tube. The heater/cooler blows hot air to the inner wall surface of said thinly walled tube at the end thereof, while cooling the outer wall surface of the thinly walled tube at the end thereof. Thereafter, the end of the thinly walled tube is pulled out of the heater/cooler by moving the tube holder. If the inner wall surface of the thinly walled tube is heated to the temperature lower than the melting point of the inner layer, the end of the thinly walled tube is radially inwardly deformed. Subsequently, the end of the thinly walled tube is made to abut the female mold by moving the tube holder. Then, the female mold cooperates with the male mold to produce the flange section by compression molding and, at the same time, makes the opening to maintain a predetermined shape by causing the end of the thinly walled tube to abut the peripheral wall surface of the female mold.

In the second embodiment of the invention, an apparatus for processing a thinly walled tube of thermoplastic resin further comprises an external heater for blowing hot air to the outer wall surface of the thinly walled tube at the end thereof.

With such an arrangement, since the inner wall surface of the thinly walled tube is heated to the temperature higher than the melting point of the inner layer, the end of the thinly walled tube is radially outwardly deformed. Subsequently, the end of the thinly walled tube is introduced into the external heater by moving the tube holder, and the outer wall surface of the thinly walled tube is heated and softened by the heater. Then, the end of the thinly walled tube is made to abut the female mold by moving the tube holder. Then, the female mold cooperates with the male mold to inwardly bend and fold the end of the thinly walled tube, so as to produce a flange section having a predetermined shape with an opening located inside the flange section, which is made to maintain a predetermined shape.

(5) Preferably, the apparatus for processing a thinly walled tube of thermoplastic resin according to the invention further comprises suction means for forcibly drawing the hot air used to heat the inner wall surface away from said tube holder.

By limiting the heated area at and near the end of the thinly walled tube, the adjacent area directly connected to the flange section is protected against any undesired deformation.

(6) Preferably, said heater/cooler includes an annular cooling section for cooling the outer wall surface of said thinly walled tube at the end thereof, a heating section arranged inside the cooling section with an annular gap interposed therebetween, and a hot air suction path communicating with said annular gap. The end of the thinly walled tube held by said tube holder is adapted to be inserted into the annular gap. Said heating section has a hot air flow path arranged in the inside thereof. Hot air discharge ports are disposed at positions facing the cooling section with the thinly walled tube disposed therebetween.

With such an arrangement, hot air flows through the hot air flow path arranged in the inside of the heating section, and is discharged to the outside from the hot air discharge ports to collide with and heat the inner wall surface of the thinly walled tube at the end thereof. After heating the inner wall surface, the hot air is forcibly drawn away through said hot air suction path. At the same time, the cooling section contacts the outer wall surface of the thinly walled tube at the end thereof to cool the outer wall surface.

(7) A thinly walled tube used in the present invention may have a multi-layer structure comprising an intermediary layer made of resin having a gas barrier property such as ethylenevinylalcohol copolymer, and a pair of adhesive polyethylene layers which sandwich the intermediate layer. Note that the material for the thinly walled tube is not limited to the above.

A tubular container prepared by a method according to the invention may suitably be used to contain a highly fluid content such as coffee, aromatic, etc.

DETAILED DESCRIPTION OF PREFERRED EMBODIMENTS

Now, the present invention will be described by referring to FIGS. 1 through 8 that illustrates a first embodiment of apparatus for processing a thinly walled tube according to the invention.

Figure 8:
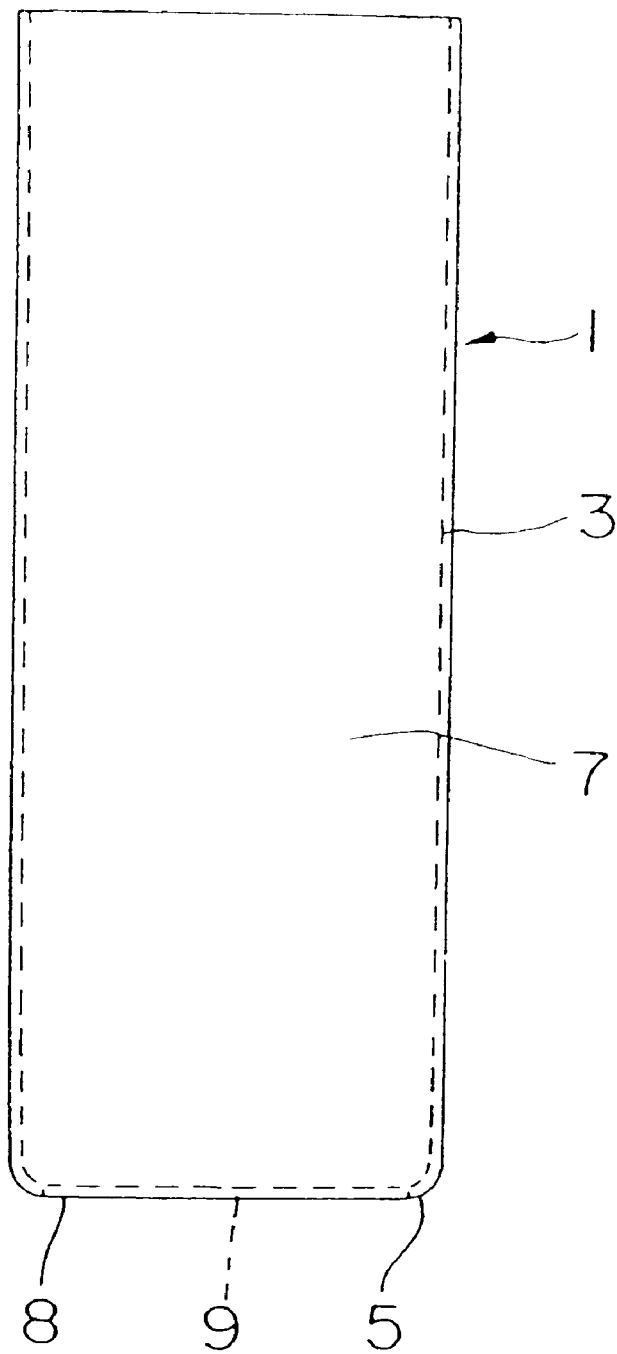
FIG. 8 is a schematic front view of a tubular container molded by the first embodiment of the invention.

Firstly, a tube processed by the first embodiment will be described by referring to FIG. 8. A tube 1 comprises a barrel section 3 produced by thermally molding a hollow cylindrical soft resin preform and an inwardly directed flange section 5 formed from resin by compression molding. The barrel section 3 has a container section 7 in its inside. The barrel section 3 has a hole 8 at its bottom, which hole is formed with an opening 9 having a predetermined shape. The barrel section 3 is also open at its top.

Figure 6:
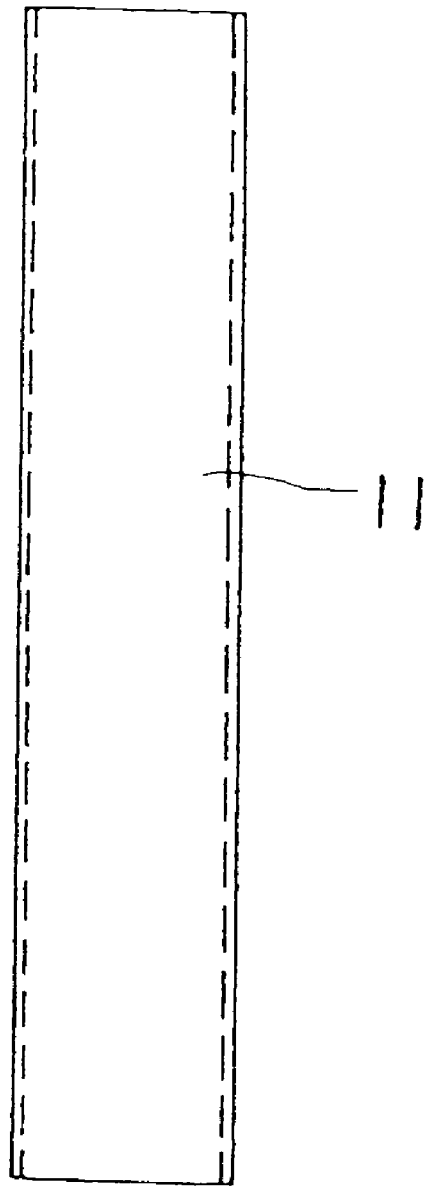
FIG. 6 is a schematic front view of a thinly walled tube used for the first or second embodiment of the invention.
Figure 7:
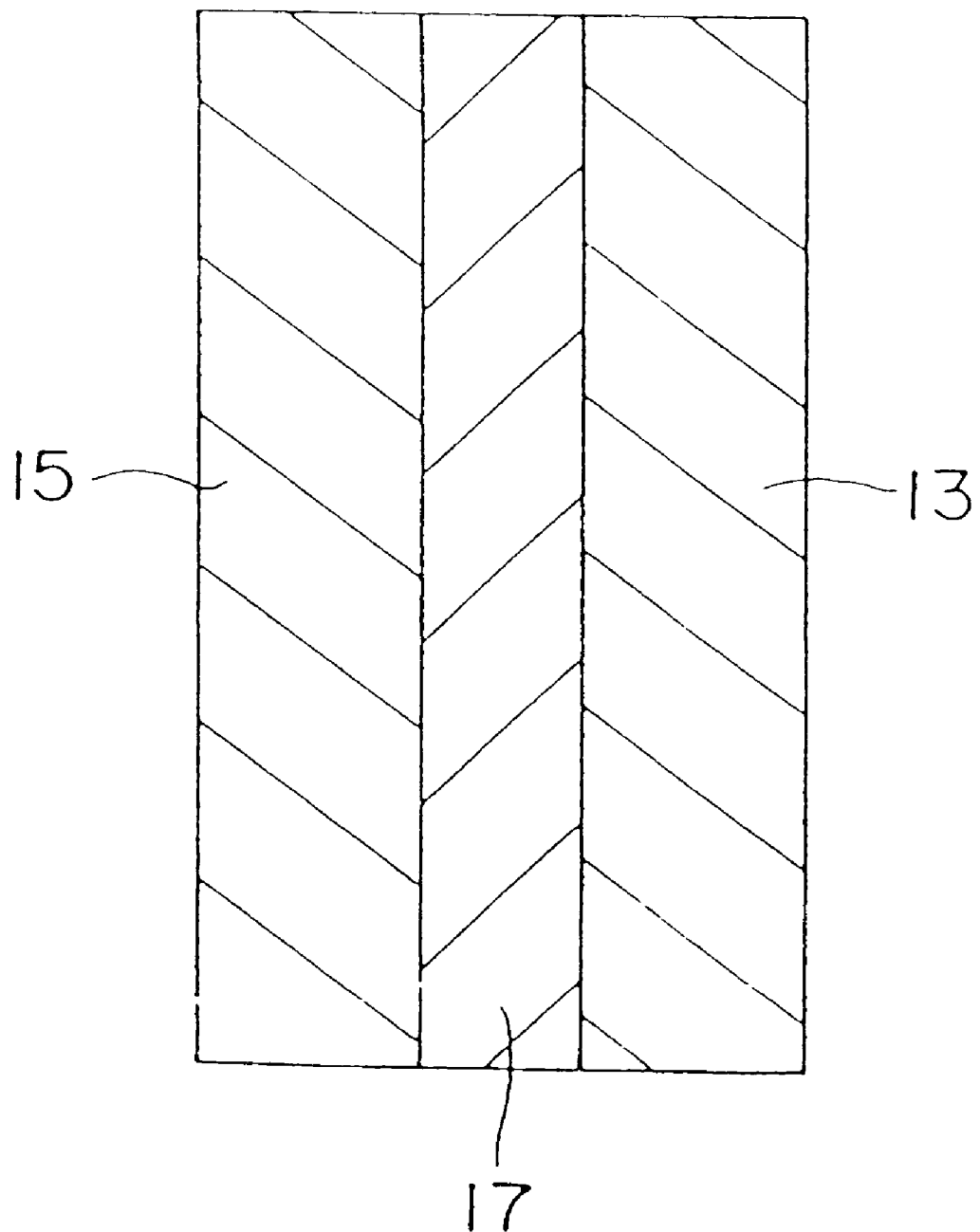
FIG. 7 is a schematic cross sectional view of a thinly walled tube used for the first or second embodiment of the invention.

The tube 1 is integrally molded from a thinly walled tube 11 as shown in FIG. 6. Referring to FIG. 7, the thinly walled tube 11 may have a three-layered structure comprising an outer layer 13, an inner layer 15 and an intermediary layer 17 sandwiched by the outer and inner layers, although the thinly walled tube 11 is not limited to three-layered structure.

The outer layer 13 can be formed from known resin material adapted to produce tubular containers, such as printable polyethylene (PE) and polypropylene (PP), although the present invention is not limited to these materials.

The inner layer and the intermediary layer 17 can be formed from known resin material having desired physical properties. If gas barrier property is required, the inner layer 15 and/or the intermediary layer 17 may be formed from a resin material having a gas barrier property, such as ethylenevinylalcohol (EVOH), polyethylene terephthalate (PET), PET-G (thermoplastic copolyester prepared by partly substituting the glycol of polyethylene terephthalate with 1,4-cyclohexanedimethanol) and polybuthylene terephthalate (PBT). If a tubular container manufactured by the method according to the invention is used for containing a product containing vitamins or coloring agents, the inner layer 15 is preferably made of a non-adsorbing resin such as non-adsorbing PET.

The outer layer, the inner layer 15 and the intermediary layer 17 may be made of adhesive resin. The use of adhesive resin is advantageous, because it can eliminate the use of an adhesive agent. Adhesive resin materials that can be used for the purpose of the invention include non-limitatively adhesive polyethylene such as Admer (trade name, available from Mitsui Petrochemical Industries) and Modic (trade name, available from Mitsubishi Chemical Industries), although the present invention is not limited to them. If adhesive resin is not used, known adhesive agent may be used for the purpose of the invention.

Thus, the present invention includes, for example, a two-layered structure comprising adhesive polyethylene and EVOH, a three-layered structure of polyethylene, adhesive and EVOH, and a five-layered structure of polyethylene, adhesive, EVOH, adhesive and polyethylene.

For the purpose of the invention, preferably, the intermediary layer 17 is made of a resin material of ethylenevinylalcohol copolymer having a gas barrier property, while the outer layer 13 and the inner layer 15 are made of adhesive polyethylene, although the present invention is not limited thereto.

In the first embodiment of the present invention, the inner wall surface of a thinly walled tube is heated, and its outer wall surface is cooled, so as to inwardly deform the thinly walled tube. The reason for this is, as described earlier, so that the inner wall surface is heated to above the glass transition temperature thereof so that it may instantaneously contract to restore the original shape according to its memory. From this point of view, if the thinly walled tube has a three-layered structure, the intermediary layer is preferably not heated significantly while the inner wall surface is heated. Thus, from this point of view, the thermoplastic resin of the inner layer preferably has a melting point lower than that of the thermoplastic resin of the intermediary layer. As described above, preferably, the intermediary layer 17 is made of ethylenevinylalcohol copolymer having excellent gas barrier property, and both the outer layer 13 and the inner layer 15 are made of adhesive polyethylene. Note that the ethylenevinylalcohol copolymer of the intermediary layer 17 has a melting point of about 180° C. and the adhesive polyethylene of the inner layer 15 has a melting point of about 110° C.

A thinly walled tube 11 may have a circular or elliptic cross sectional view.

Such a thinly walled tube 11 may be prepared by conventional method. If the thinly walled tube 11 comprises, for example, an outer layer 13 of adhesive polyethylene, an intermediary layer 17 of ethylenevinylalcohol copolymer and an outer layer 15 of adhesive polyethylene, it may be prepared in a manner as described below. Firstly, adhesive polyethylene is heated, extended and molded into a hollow cylindrical shape by means of an extruder. Thereafter, ethylenevinylalcohol copolymer is also heated, extended, extrusion-molded, and laid on the outer surface of the extrusion-molded product of adhesive polyethylene. Subsequently, adhesive polyethylene is heated, extended and laid on the outer surface of the molded layer of ethylenevinylalcohol copolymer to produce a three-layered structure, which is then cut to a predetermined length to produce the thinly walled tube 11.

Now, the apparatus for processing the thinly walled tube into a tubular container 1 used in the first embodiment will be described by referring to FIGS. 1 through 8.

<The Overall Configuration of the Apparatus for Processing a Thinly Walled Tube into a Tubular Container>

The apparatus for processing the thinly walled tube 11 into a tubular container 1 comprises a tube holder 19, a heater/cooler 21 and a female mold 23.

<A Detailed Description of the Components>

Now, each of the components will be described in detail.

<The Tube Holder>

Figure 1:
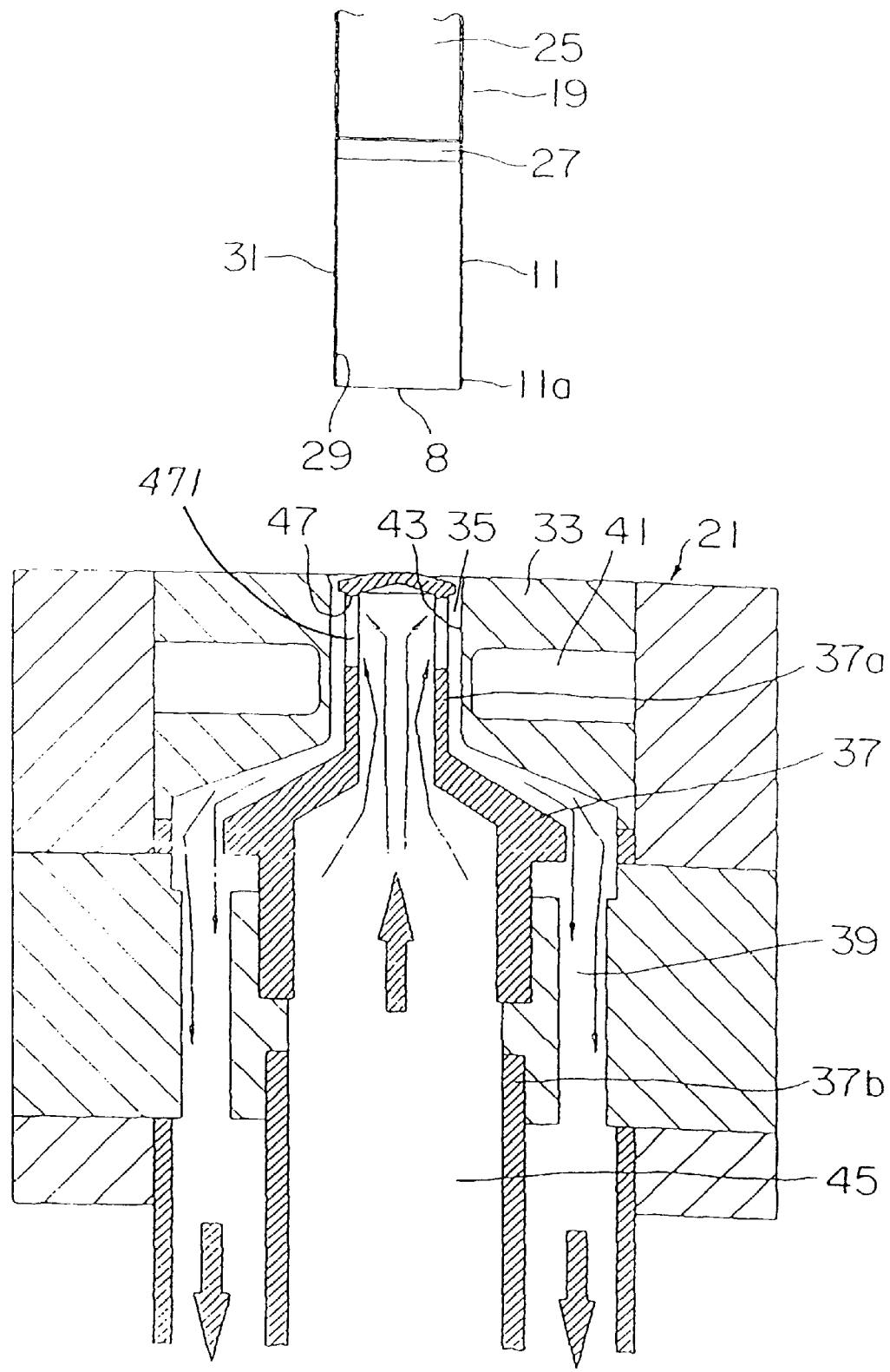
FIG. 1 is a schematic cross sectional view of the tube holder for holding a thinly walled tube, and the heater/cooler of the first embodiment of the invention, and illustrating the first step of the method.
Figure 2:
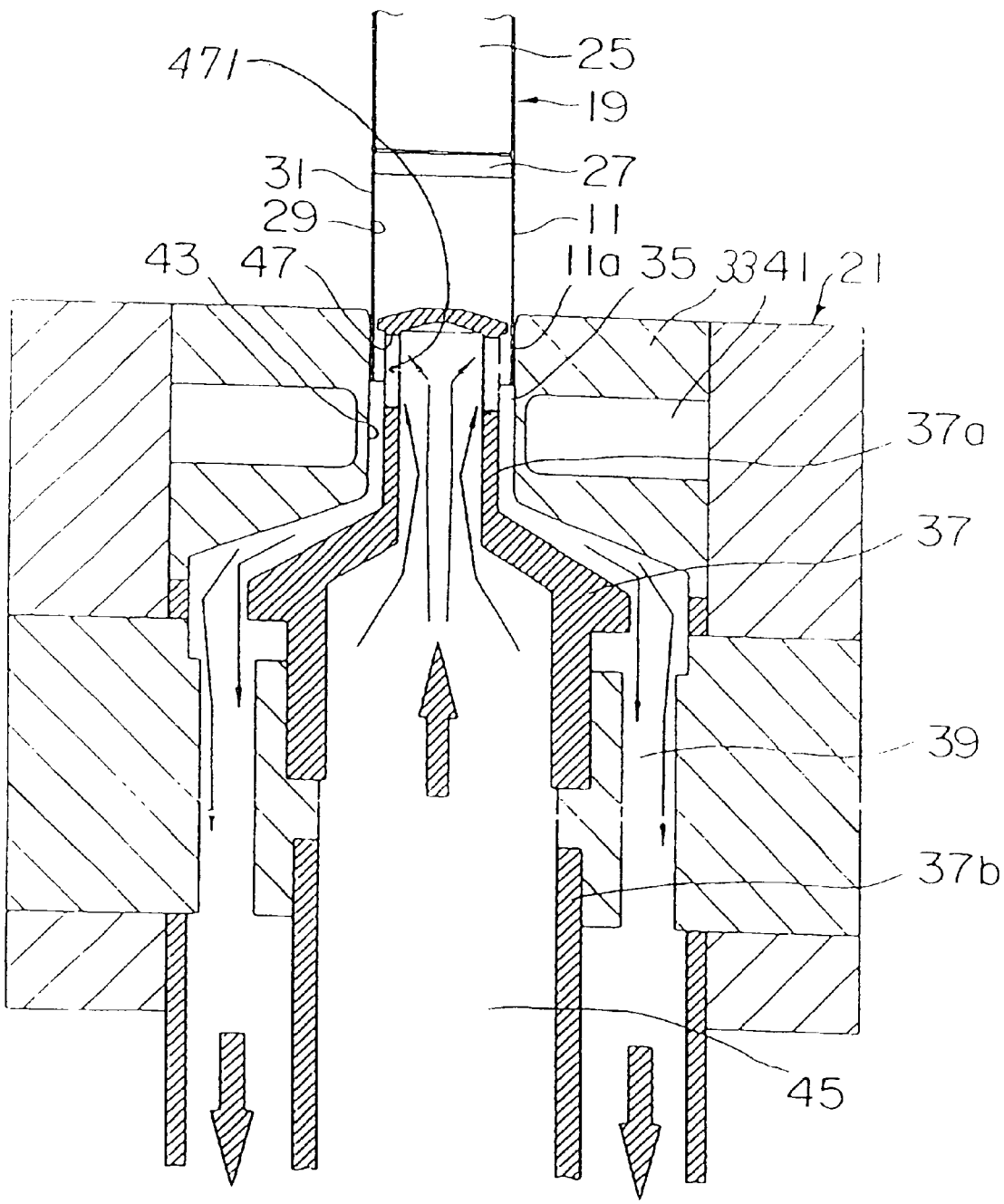
FIG. 2 is a schematic cross sectional view of the tube holder and the heater/cooler of the first embodiment of apparatus according to the invention, and illustrating the second step of the method.

The tube holder 19 holds the thinly walled tube 11 and forms the flange section 5 by compression molding. It also provides the opening 9 in the inside of the hole 8 and makes it maintain a predetermined shape. As shown in FIG. 1, the tube holder 19 comprises a tube holder main body 25 and a male mold 27. Both the tube holder main body 25 and the male mold 27 show a circular cross sectional view corresponding to that of the thinly walled tube 11. The male mold 27 is arranged at the front end of the tube holder main body 25 and vertically movable relative to the tube holder main body 25.

Figure 3:
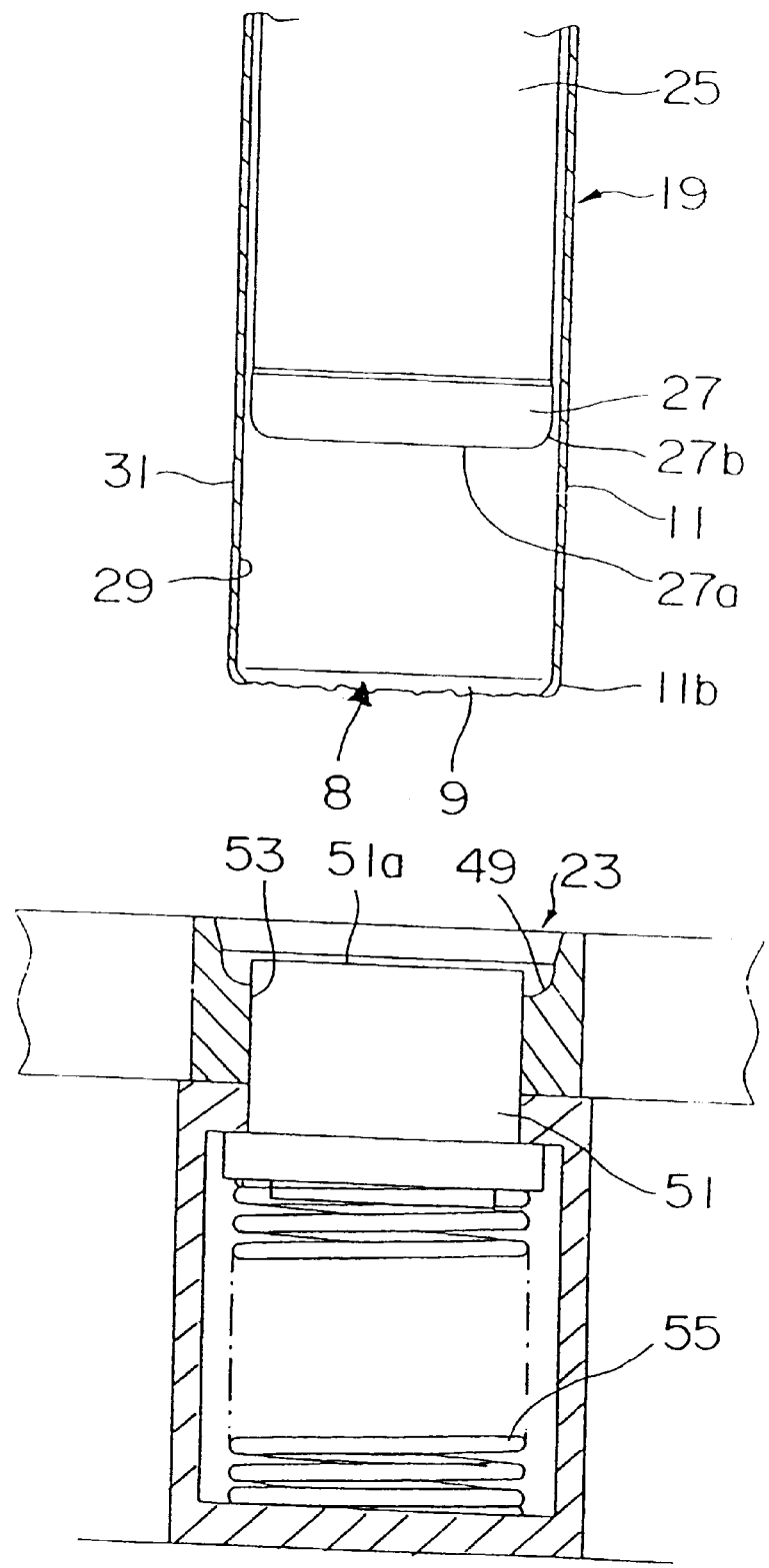
FIG. 3 is a schematic cross sectional view of the tube holder and female mold of the first embodiment of apparatus according to the invention, and showing the third step of the method.

The male mold 27 has a flat surface 27a at its front end, and an outer periphery 27b which has a profile corresponding to that of the inside of the flange section 5 of the tubular container 1 as will be best seen from FIG. 3.

As shown in FIG. 1, the thinly walled tube 11 is held by the tube holder main body 25 with its front end projecting from that of the tube holder 19 by a predetermined distance. The male mold 27 is so arranged that it can move inside the thinly walled tube 11 in the axial direction of the tube holder 19, if the thinly walled tube 11 is secured to the tube holder 19.

The above predetermined distance refers to a distance with which the front end 11a of the tube holder 11 certainly enters the annular gap 35 when the tube holder main body 25 is moved downwardly by a predetermined stroke.

<The Heater/Cooler>

The heater/cooler 21 heats the inner wall surface 29 of the thinly walled tube and cools the outer wall surface 31, so that the inner wall surface 29 is softened while the thinly walled tube 11 shows a temperature difference between its inside and its outside. As shown in FIG. 1, the heater/cooler 21 comprises an annular cooling section 33 for cooling the outer wall surface 31 of the thinly walled tube 11 at the front end 11a thereof, a heating section 37 arranged inside the cooling section 33 with an annular gap 35 interposed therebetween and a hot air suction path 39 communicating with said annular gap 35.

The cooling section 33 is provided with a circulating section 41 for circulating a cooling medium such as water contained in the inside, and a cooling surface 43 arranged on the inner peripheral surface thereof for cooling the outer wall surface 31 of the thinly walled tube 11. Since the outer wall surface 31 of the thinly walled tube 11 is held in contact with the cooling surface 43, the outer wall surface 31 is cooled.

The heating section 37 has a topped hollow cylindrical shape and has a hot air flow path 45 communicating with a hot air supply source (not shown). The heating section 37 has a small diameter section 37a in an upper portion thereof and a large diameter section 37b in a lower portion thereof. The small diameter section 37a can be introduced into the inside of the front end 11a of the thinly walled tube 11. The large diameter section 37b is arranged under the small diameter section 37a. The small diameter section 37a is provided at the top thereof with hot air discharge ports 47 that are substantially extending along the outer periphery of the top of the small diameter section 37a to face said cooling surface 43. In the illustrated embodiment, thin link bars 471 are arranged vertically at a predetermined intervals along the outer periphery of the top of the small diameter section 37a.

The hot air suction path 39 communicates with the annular gap 35 as described above, and also with hot air suction means (not shown) to draw hot air away from the front end 11a of the thinly walled tube 11.

<The Female Mold>

As shown in FIG. 3, the female mold 23 comprise a cavity 49 having a shape corresponding to profile of the flange section 5 of the tubular container 1 to be molded, and an opening-maintaining section 51 which maintains the shape of the opening 9 at the front end 11b of the thinly walled tube 11 and operates as shock absorber for absorbing the kinetic energy of the falling male mold 27. An engaging hole 53 is arranged at the bottom of the cavity 49.

The opening-maintaining section 51 has a cylindrical profile, and is adapted to enter the engaging hole 53 and be vertically movable relative to the cavity 49. It is constantly urged upwardly by biasing means 55.

<The Steps for Processing a Thinly Walled Tube into a Tubular Container 1>

Now, the steps for processing a thinly walled tube into the tubular container 1 will be described in detail.

<The 1st Step>

In the first step, the thinly walled tube 11 is placed in position. This will be described by referring to FIG. 1.

The thinly walled tube 11 to be processed into a tubular container 1 is secured to the outside of the tube holder main body 25 in such a way that the front end of the thinly walled tube 11 protrudes axially and outwardly by a predetermined distance from the front end of the tube holder 19.

<The 2nd Step>

In the second step, the front end 11a of the thinly walled tube 11 is inwardly deformed. This will be described by referring to FIGS. 2 and 3.

The tube holder 19 holding the thinly walled tube 11 is moved until the front end 11a of the thinly walled tube 11 is brought into the annular gap 35 between the cooling surface 43 of the cooling section 33 and the small diameter section 37a of the heating section 37 and faces the hot air discharge ports 47. Then, the inner wall surface 29 of the thinly walled tube 11 is heated at the front end 11a, while its outer wall surface 31 is cooled at the front end 11a simultaneously. The heating operation is performed by causing hot air to flow through the hot air flow path 45 in the heating section 37 along the arrows shown in FIG. 2 and to become discharged through the hot air discharge ports 47. The inner wall surface 29 of the thinly walled tube 11 becomes softened at the front end 11a by the heat. In a first embodiment of the present invention, the inner wall surface 29 is heated to a temperature lower than the melting point of the inner layer. The hot air that has collided with the inner wall surface 29 is then forcibly drawn downwardly and away from the heating section 37 through the hot air suction path 39 by hot air suction means (not shown). Therefore, the portions of the thinly walled tube 11 that should not be heated are minimally affected by the heating operation.

The cooling operation is performed by absorbing heat from the outer wall surface 31 of the front end 11a of the thinly walled tube 11 (held in contact with the cooling surface 43) by means of the cooling medium such as water circulated in the circulating section 41. Since the outer wall surface 31 of the thinly walled tube 11 is cooled at the front end 11a, a temperature difference is produced between the inner wall surface 29 and the outer wall surface 31 of the thinly walled tube 11 at the front end 11a thereof.

When the heated/cooled thinly walled tube 11 is removed from the heater/cooler 21, the front end 11a of the thinly walled tube 11 inwardly deforms as shown in FIG. 3. It is considered that this deformation is caused as the inner layer 15 instantaneously contracts to restore its original shape according to its memory because of a result of heating the inner layer 15 to a temperature lower than the melting point of the inner layer while cooling the outer layer 13.

<The 3rd Step>

Thereafter, in the third step, the inwardly extending flange section 5 is formed at the front end 11a of the thinly walled tube 11, and the opening 9 with the predetermined shape is formed and maintained inside the flange section 5. This will be described by referring to FIG. 5.

Figure 4:
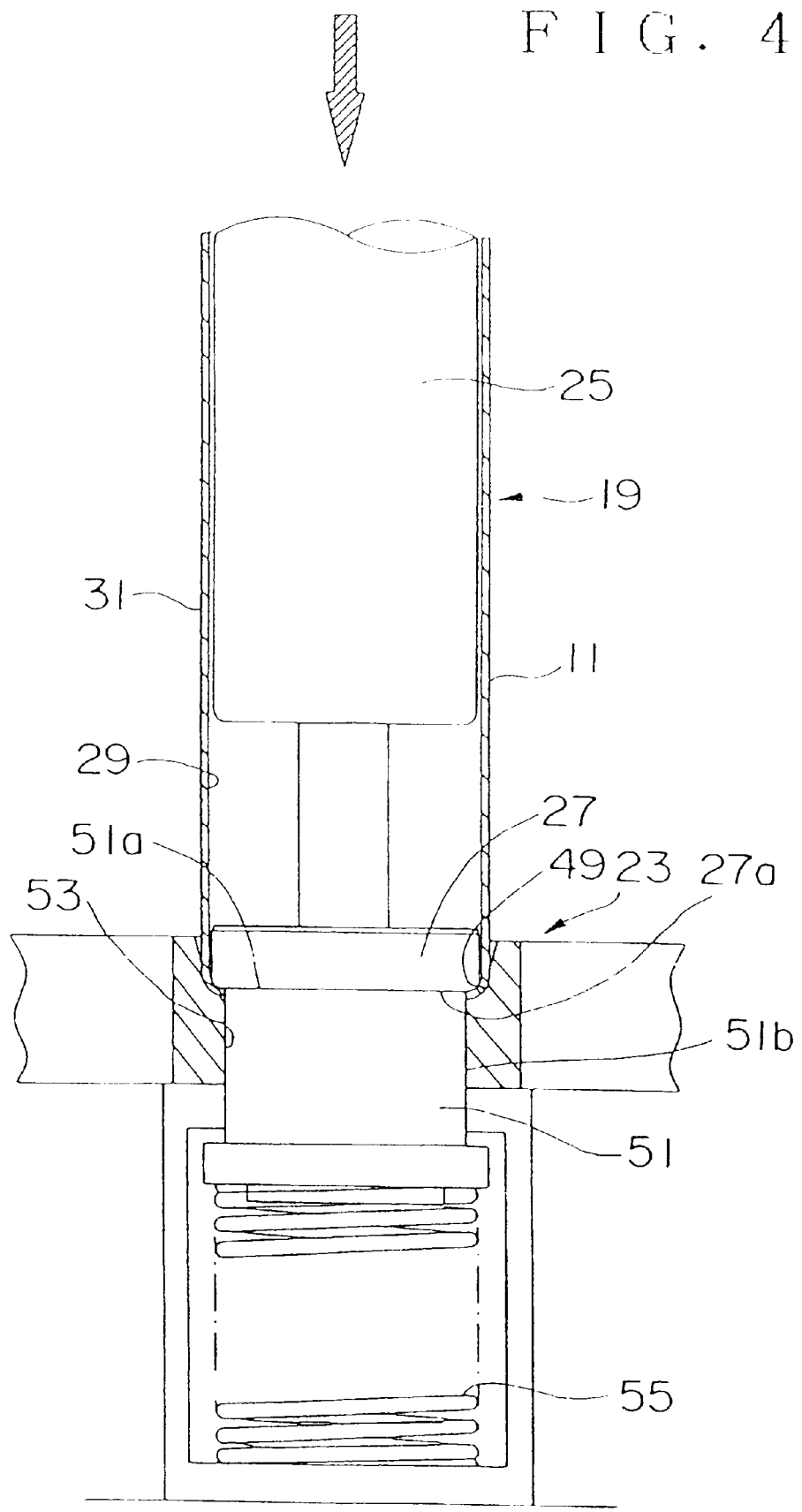
FIG. 4 is a schematic cross sectional view of the first embodiment showing the third step.

The tube holder 19 holding the thinly walled tube 11 having a deformed front end 11a is then moved to above the cavity 19 of the female mold 23 as illustrated in FIG. 3, and then is moved downwardly until the front end 11b of the thinly walled tube 11 is placed within the cavity 49 and the opening-maintaining section 51 is inserted in the opening 9. Thereafter, as shown in FIG. 4, the male mold 27 is moved downwardly relative to the tube holder main body 25 until its front end 27a abuts the front end 51a of said opening-maintaining section 51 to move the opening-maintaining section 51 below the female mold 23. At the same time, the male mold 27 cooperates with the female mold 23 to pinch the front end 11a of the thinly walled tube 11 in its cavity 49 to form the flange section 5 by compression molding, while the front end 11a of the thinly walled tube 11 can not deform or be moved by a peripheral wall surface 51b of the opening-maintaining section 51 so as to maintain the shape of the opening 9.

Figure 5:
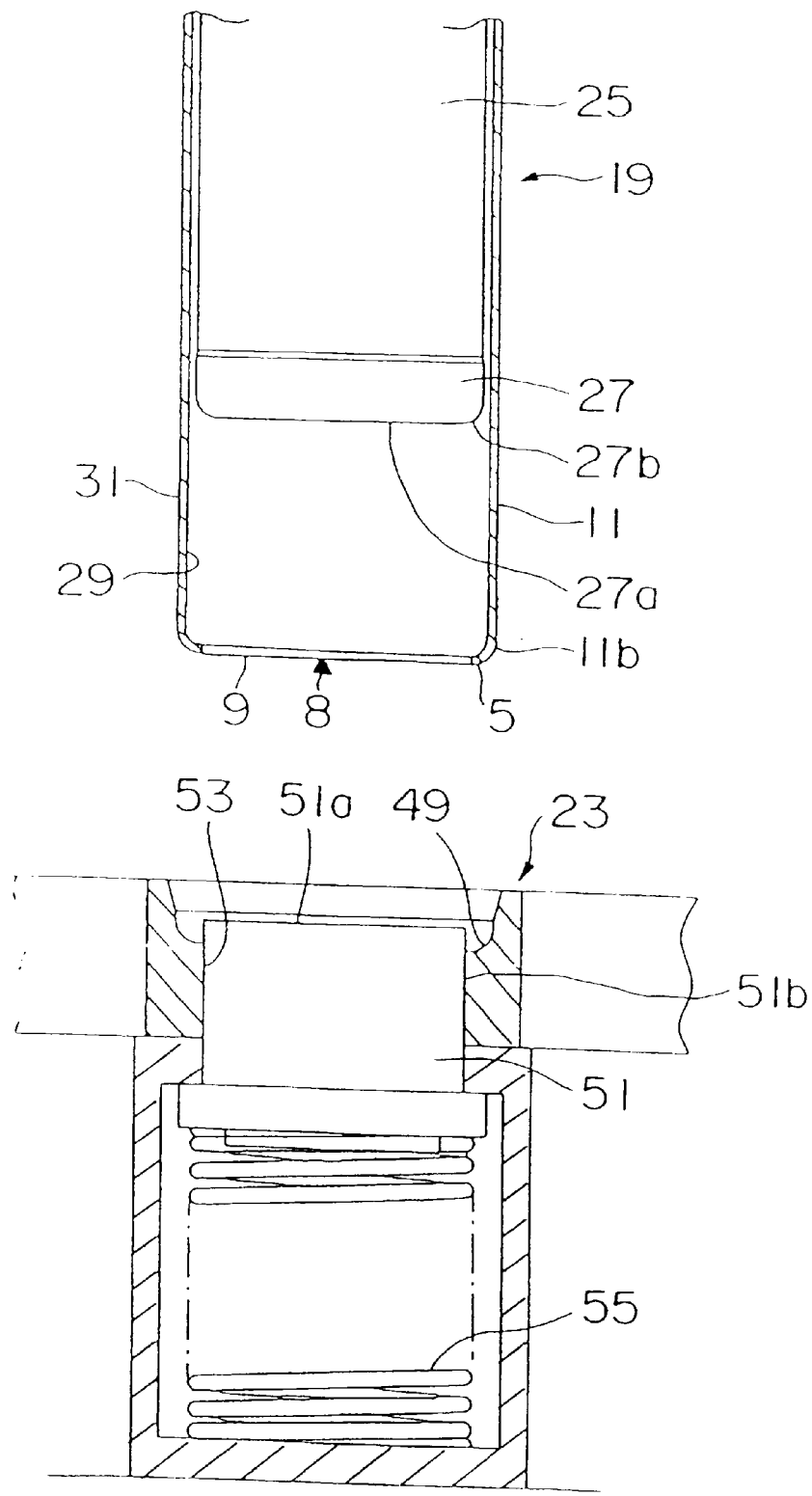
FIG. 5 is a schematic cross sectional view of the tube holder and female mold of the first embodiment of apparatus according to the invention, and showing that the third step is over.

After the compression molding, the male mold 27 is moved upwardly relative to the tube holder main body 25 and, as shown in FIG. 5, the tube holder 19 holding the thinly walled tube 11 is pulled upwardly. Then, the thinly walled tube 19 is removed from the tube holder 19 to complete the operation of producing a tubular container 1.

<The Second Embodiment of the Invention>

Now, the second embodiment of the invention will be described.

Figure 17:
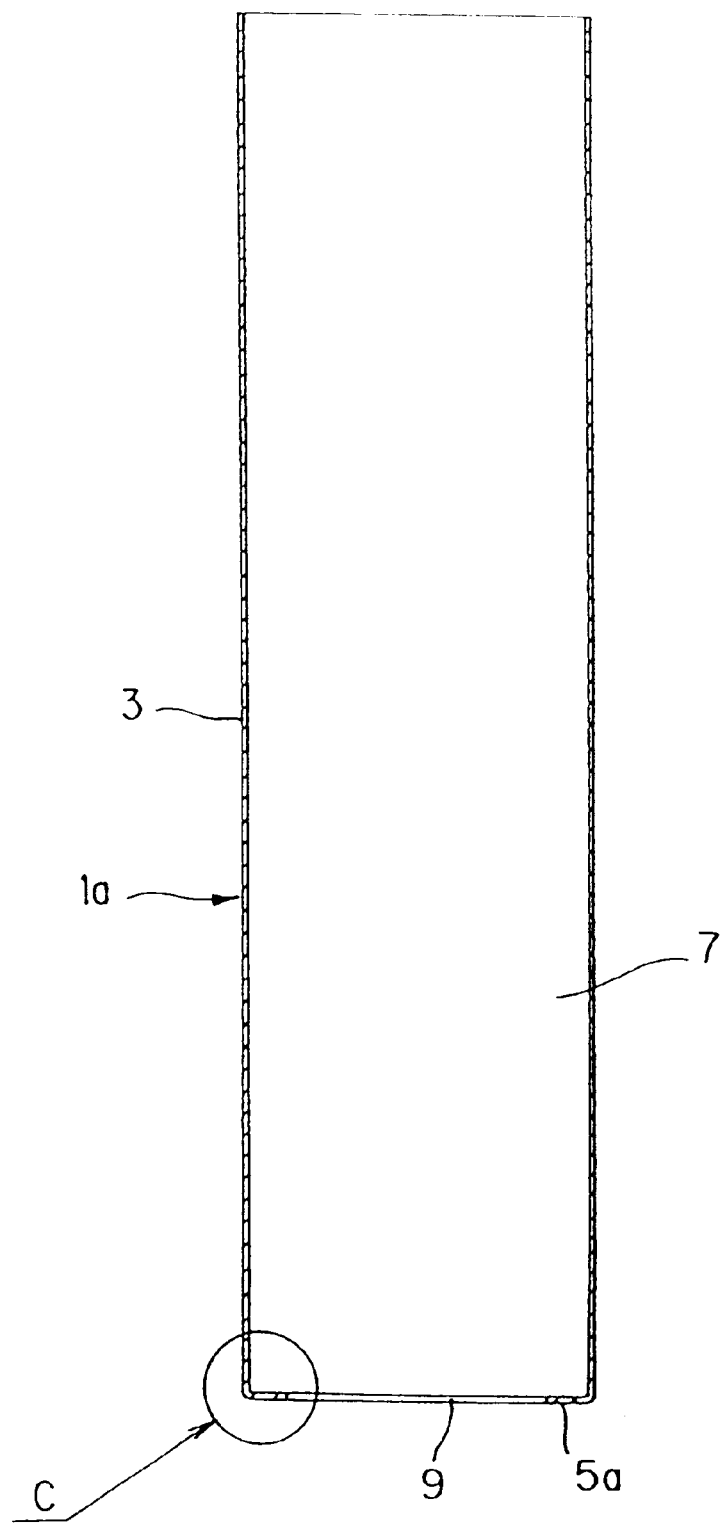
FIG. 17 is a schematic cross sectional view of a tubular container molded by the second embodiment of the invention.
Figure 18:
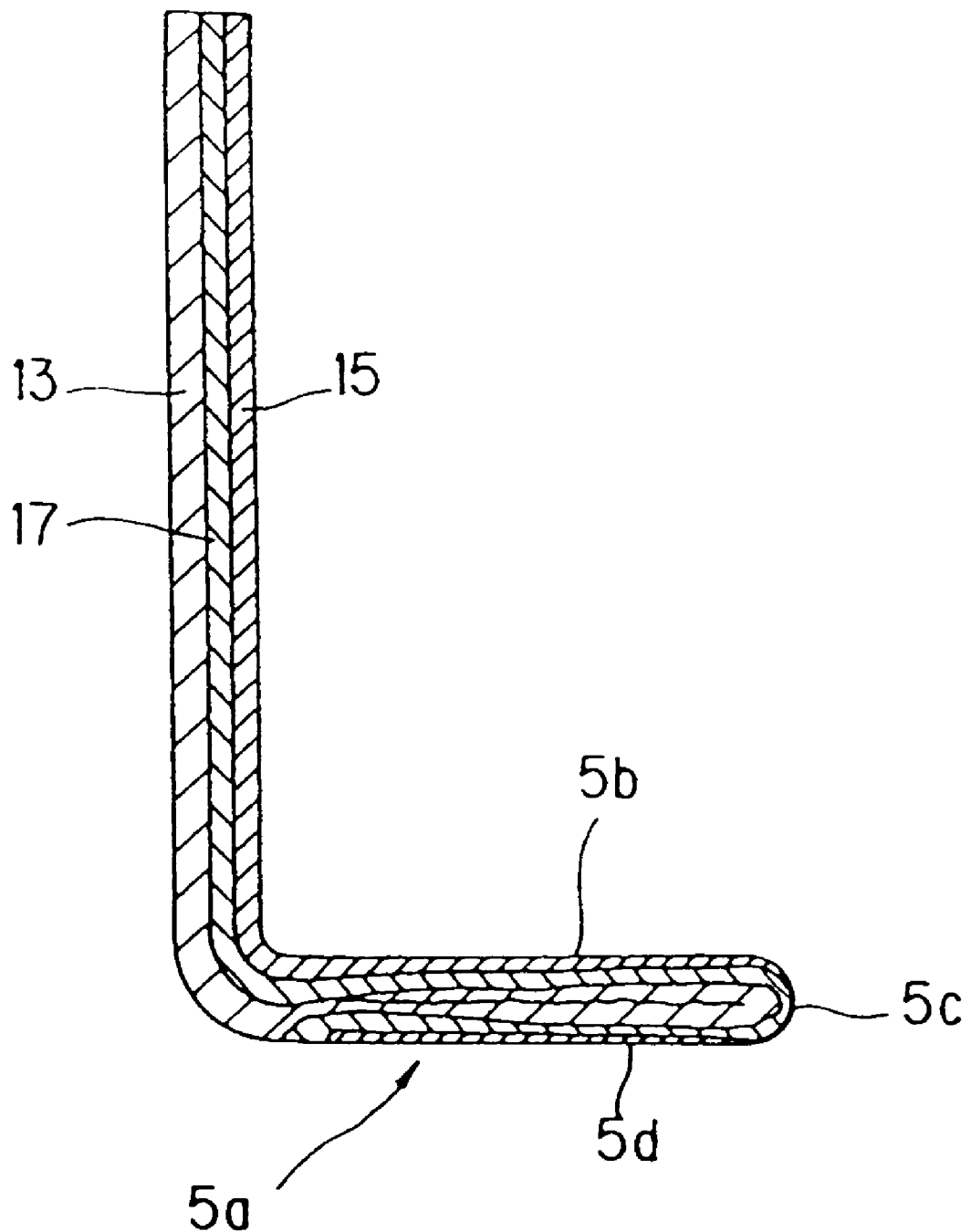
FIG. 18 is an enlarged cross sectional view of the tubular container of FIG. 17, showing only the area encircled by C.

FIGS. 17 and 18 shows a tubular container 1a processed by the second embodiment of the invention. The tubular container 1a comprises a barrel section 3 produced by thermally molding a hollow cylindrical resin preform, and an inwardly directed flange section 5a formed from resin by compression molding. The barrel section 3 has a container section 7 in its inside. An opening 9 is formed at a hole 8 at the bottom of the barrel section 3 and has a predetermined shape. The barrel section 3 is also open at the top. The tubular container 1a processed by the second embodiment of the invention differs from the tubular container 1 processed by the first embodiment of the invention in that an upper surface 5b, an inwardly directed end surface 5c and a lower surface 5d of the flange section 5a are covered by the inner layer 15 of the thinly walled tube. Note that the illustrated thinly walled tube 11 has a three-layered structure.

Otherwise, the thinly walled tube 11 is identical with its counterpart described above for the first embodiment of the invention, and hence will not be described any further.

<The Apparatus to be Used for the Second Embodiment of the Invention>

The apparatus used in the second embodiment of the invention comprises a tube holder 19, a heater/cooler 21a, an external heater 61 and a female mold 71. The tube holder 19 is identical with its counterpart described above and hence its description will be omitted here.

The heater/cooler 21a in the second embodiment is identical with its counterpart described above except for hot air discharge ports 47a. Vertically arranged thin link bars 471a are shorter than the above described link bars 471 and the hot air discharge ports 47a in the second embodiment have an opening smaller than the opening of the above described hot air discharge ports 47. Therefore, the temperature and the flow rate of the hot air flowed in the hot air flow path 45 are same as those of the first embodiment, hot air will be discharged from the hot air discharged ports 47a of this embodiment more vigorously and forced to collide with a smaller area of the front end of the thinly walled tube 11 to consequently heat the front end 11a to a higher temperature.

Figure 10:
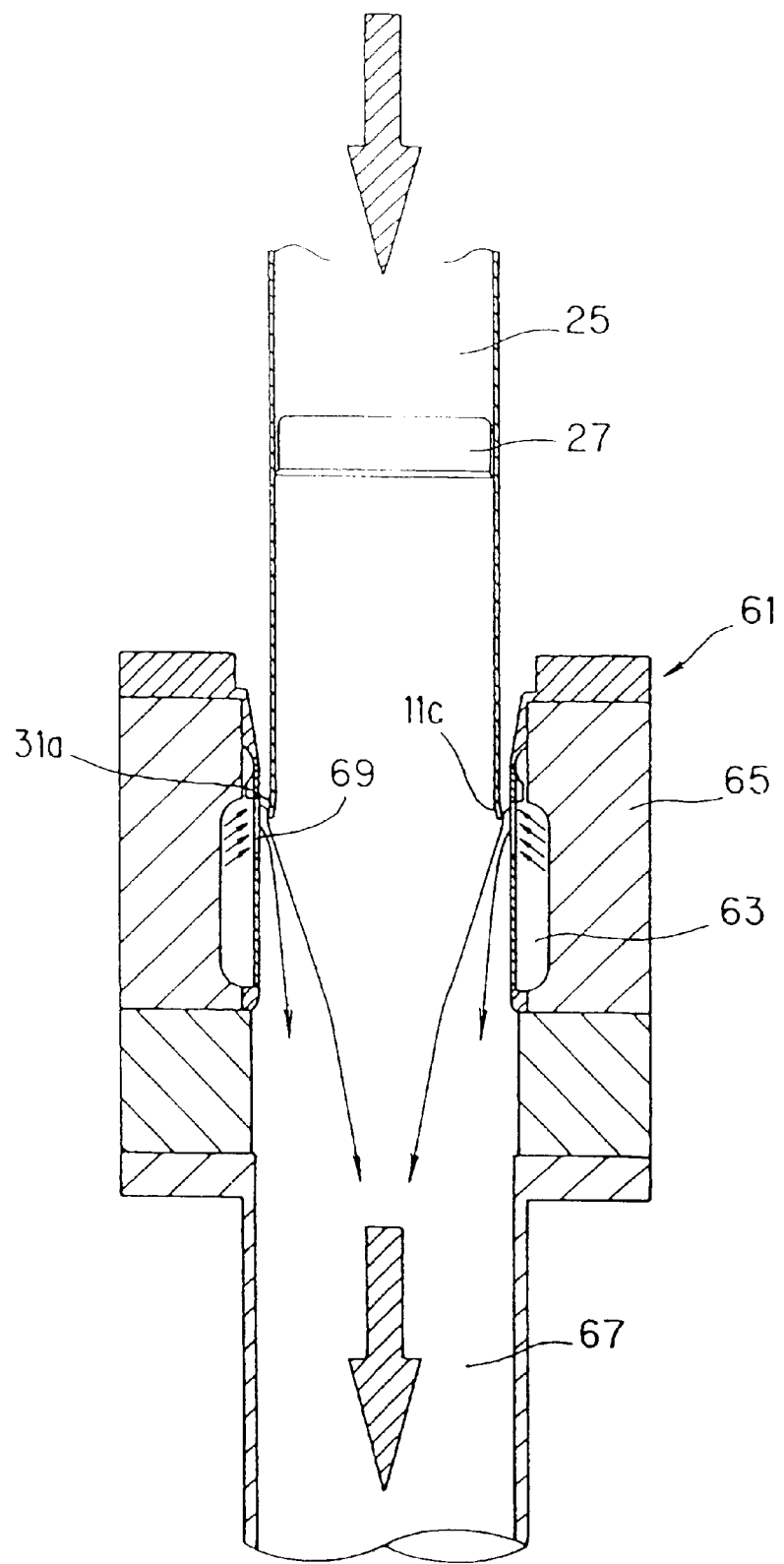
FIG. 10 is a schematic cross sectional view of the external heater of a second embodiment of the invention.

The external heater 61 is used to heat the outer wall surface of the thinly walled tube at the front end. As shown in FIG. 10, the external heater 61 comprises an annular heating section 65 and a hot air suction path 67. The heating section 65 contains therein a hot air flow path 63. The front end 11c of the thinly walled tube 11 held by the tube holder 19 can be introduced into the inside of the heating section 65. A hot air suction path 67 is arranged at the bottom of the heating section 65 and communicates with the inside of the heating section 65 and hot air suction means (not shown). The heating section 65 is provided with hot air discharge ports 69 arranged at position facing the front end 11c of the thinly walled tube inserted in the heating section 65.

Figure 11:
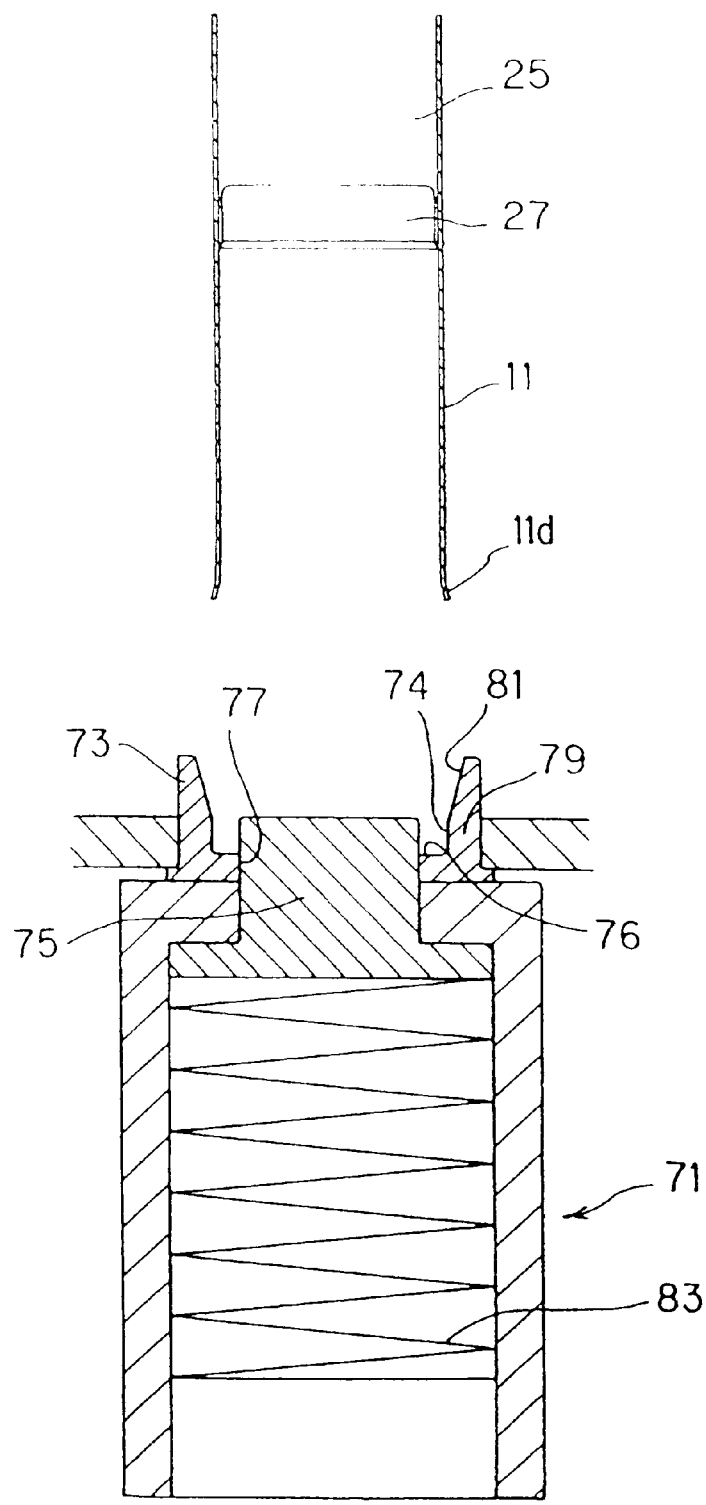
FIG. 11 is a schematic cross sectional view of the tube holder and the female mold of the second embodiment of the invention, and showing that they are ready for the flange molding step of the method.
Figure 12:
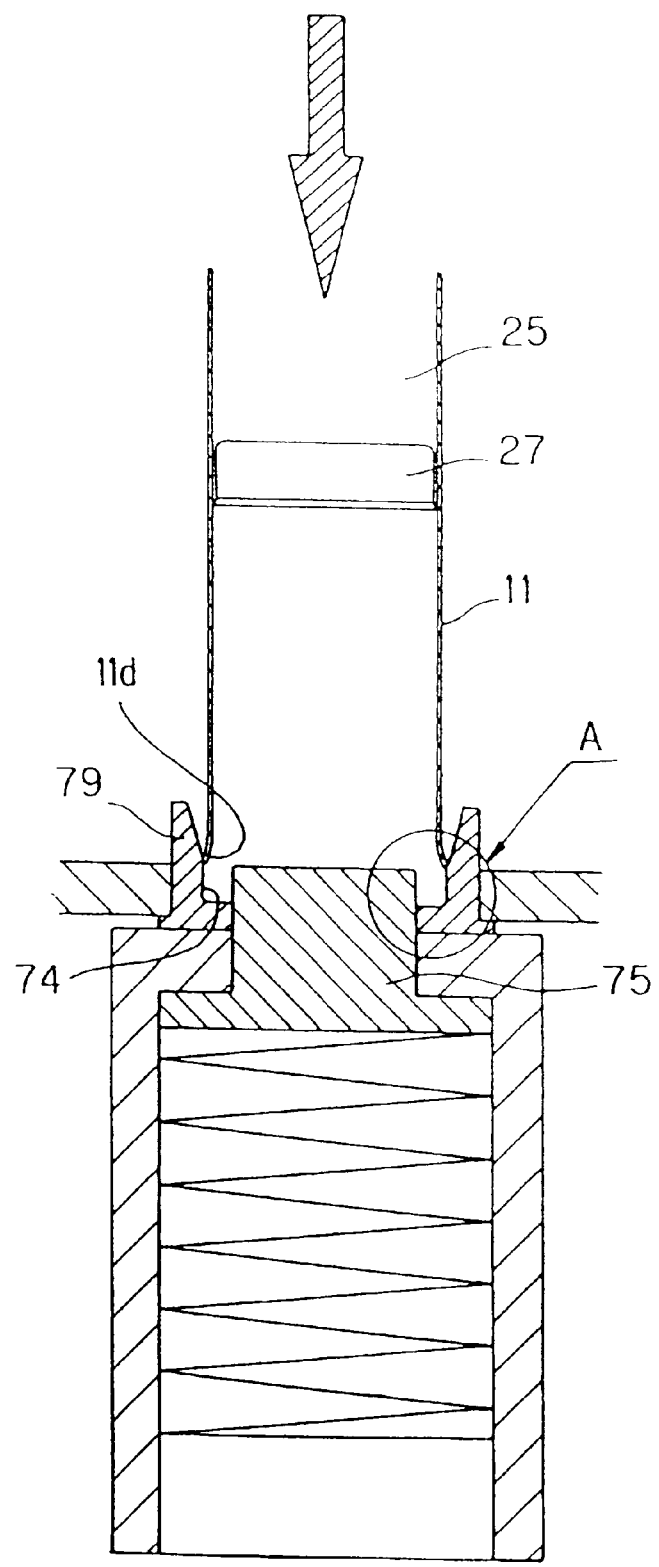
FIG. 12 is a schematic cross sectional view of the second embodiment, and showing that the flange molding step has started.

As seen from FIG. 11, the female mold 71 of this second embodiment comprises a metal mold 73 having a cavity 74 therein and an opening-maintaining section 75. An engaging hole 77 is arranged at a bottom 76 of the cavity of the metal mold 73. The cavity 74 has a shape corresponding to a profile of the flange section 5a of the tubular container 1a to be formed. The metal mold 73 has a guide wall 79 having a tapered upper half 81 so that the radially outwardly deformed front end 11c of the thinly walled tube 11 can be introduced into the cavity 74 without difficulty.

The opening-maintaining section 75 has a cylindrical shape, is adapted to enter the engaging hole 77, is vertically movable relative to the cavity 74, and is constantly urged upwardly by biasing means 83. The opening-maintaining section 75 maintains the shape of opening 9 of the front end 11c of the thinly walled tube 11, and also operates as shock absorber for absorbing the kinetic energy of the tube holder 19.

<The Steps for Processing a Thinly Walled Tube into a Tubular Container with the Second Embodiment of the Invention>

Now, the steps for processing the thinly walled tube into the tubular container 1 with the second embodiment of the invention will be described by referring to FIGS. 11–16, 19 and 20.

Figure 19:
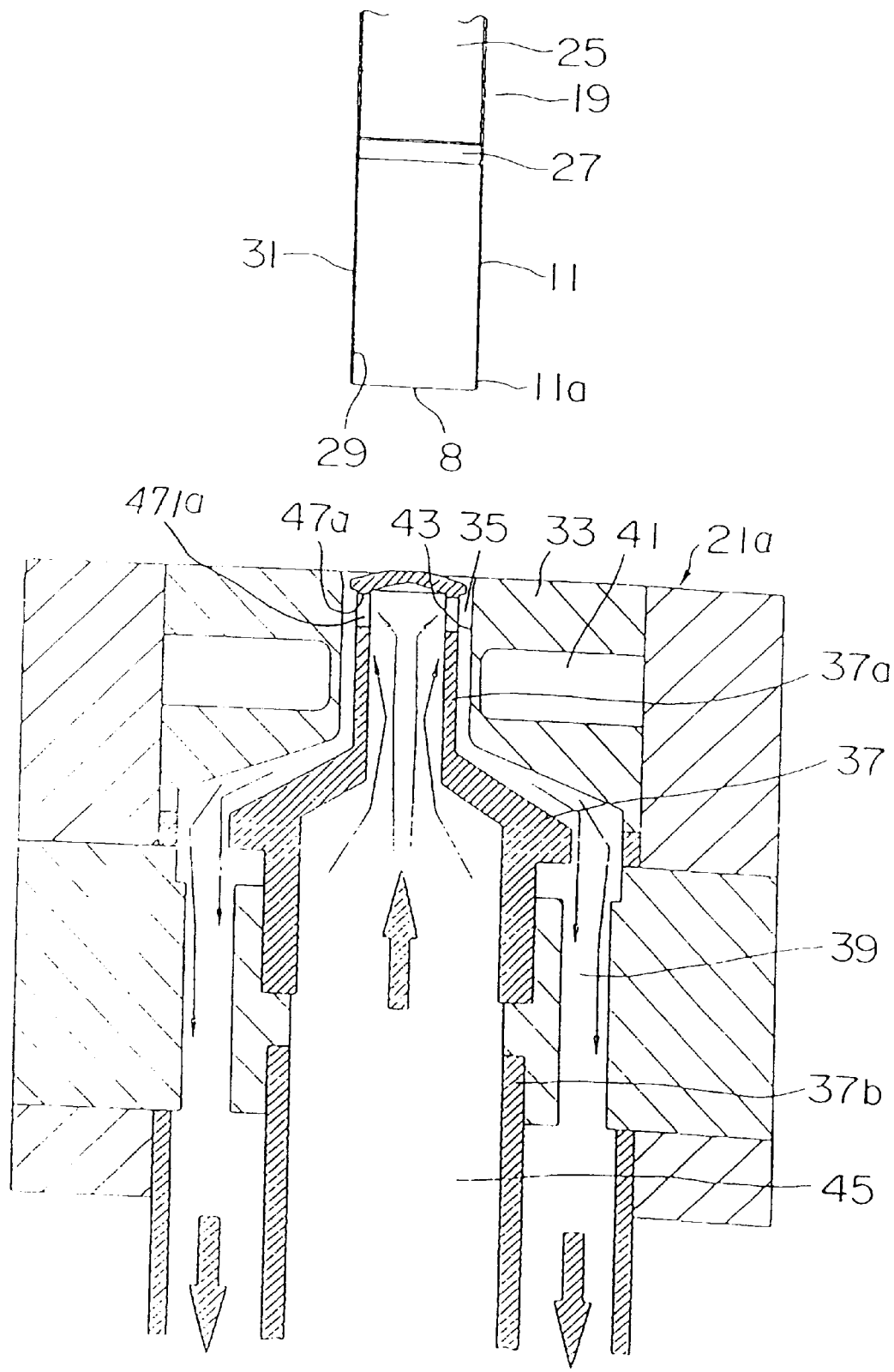
FIG. 19 is a cross sectional view of the tube holder for holding a thinly walled tube and the heater/cooler of the second embodiment of the invention, and illustrating the first step of the method.
Figure 20:
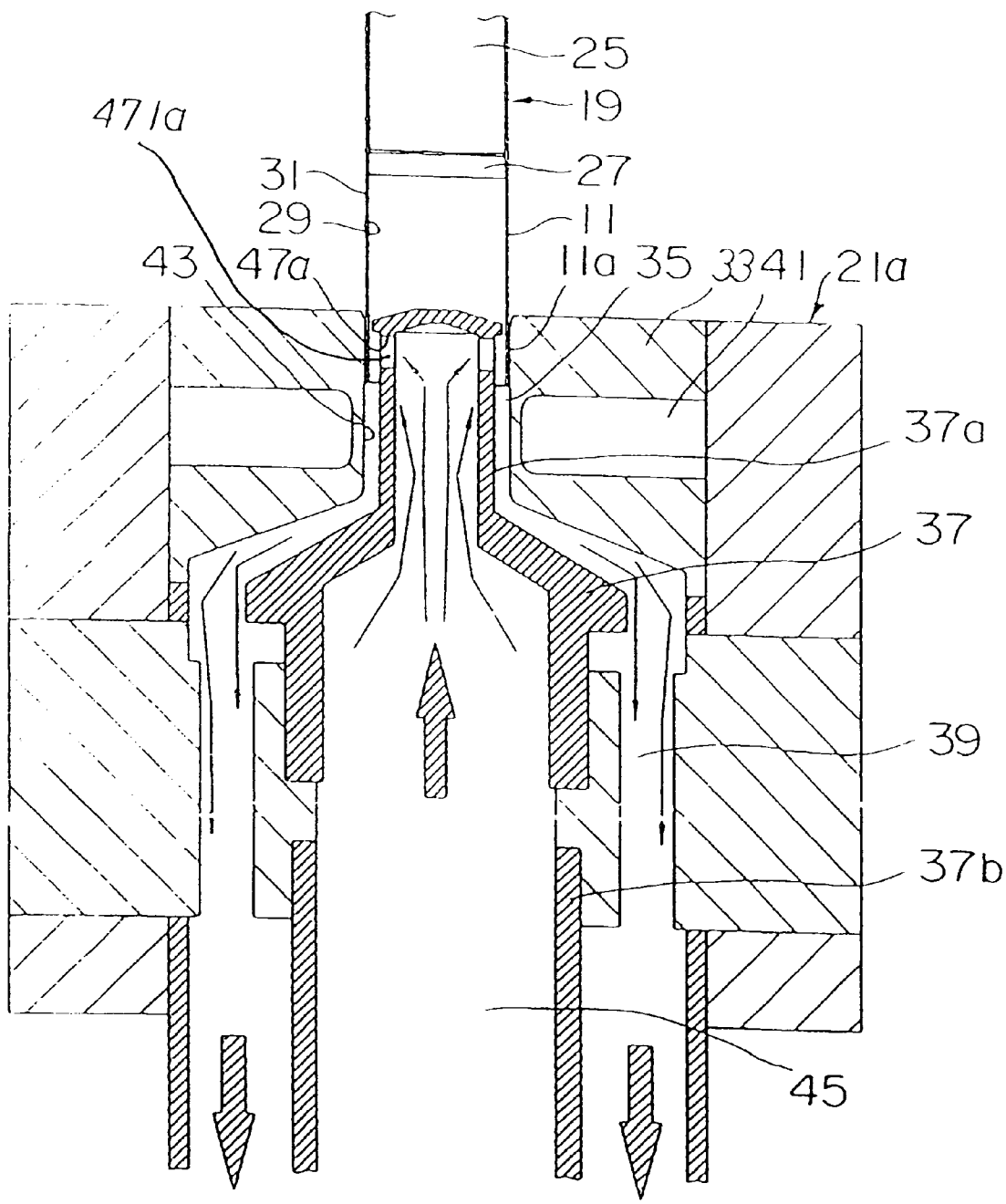
FIG. 20 is a cross sectional view of the tube holder for holding a thinly walled tube and the heater/cooler of the second embodiment of the invention, and illustrating the second step of the method.

The first step of securing the thinly walled tube 11 in position is identical with the first step described above for the first embodiment of the invention and hence will not be described here any further (FIG. 19).

In the second step for outwardly deforming the front end 11a of the thinly walled tube 11, the front end 11a of the thinly walled tube 11 is introduced into the gap 35 and placed in position, where the front end 11a of the thinly walled tube 11 faces the hot air discharge ports 47a. Then, the inner wall surface 29 of the front end 11a of the thinly walled tube 11 is heated by means of the heating section 37, while the outer wall surface 31 of the front end 11a of the thinly walled tube 11 is cooled by the cooling surface 43 as in the case of the above described first embodiment.

In this second embodiment of the invention, the inner wall surface is heated to a temperature higher than the melting point of the inner layer by controlling the temperature of the hot air blown onto it, the duration of the hot air blowing operation and the area of the hot air discharge ports 47a. In the embodiment illustrated in FIG. 20, the hot air discharge ports 47a has an area smaller than the hot air discharge ports 47 of the heater/cooler 21 of the first embodiment, so that the inner wall surface 29 can be heated to a temperature higher than the melting point of the inner layer in this second embodiment of the invention.

Figure 9:
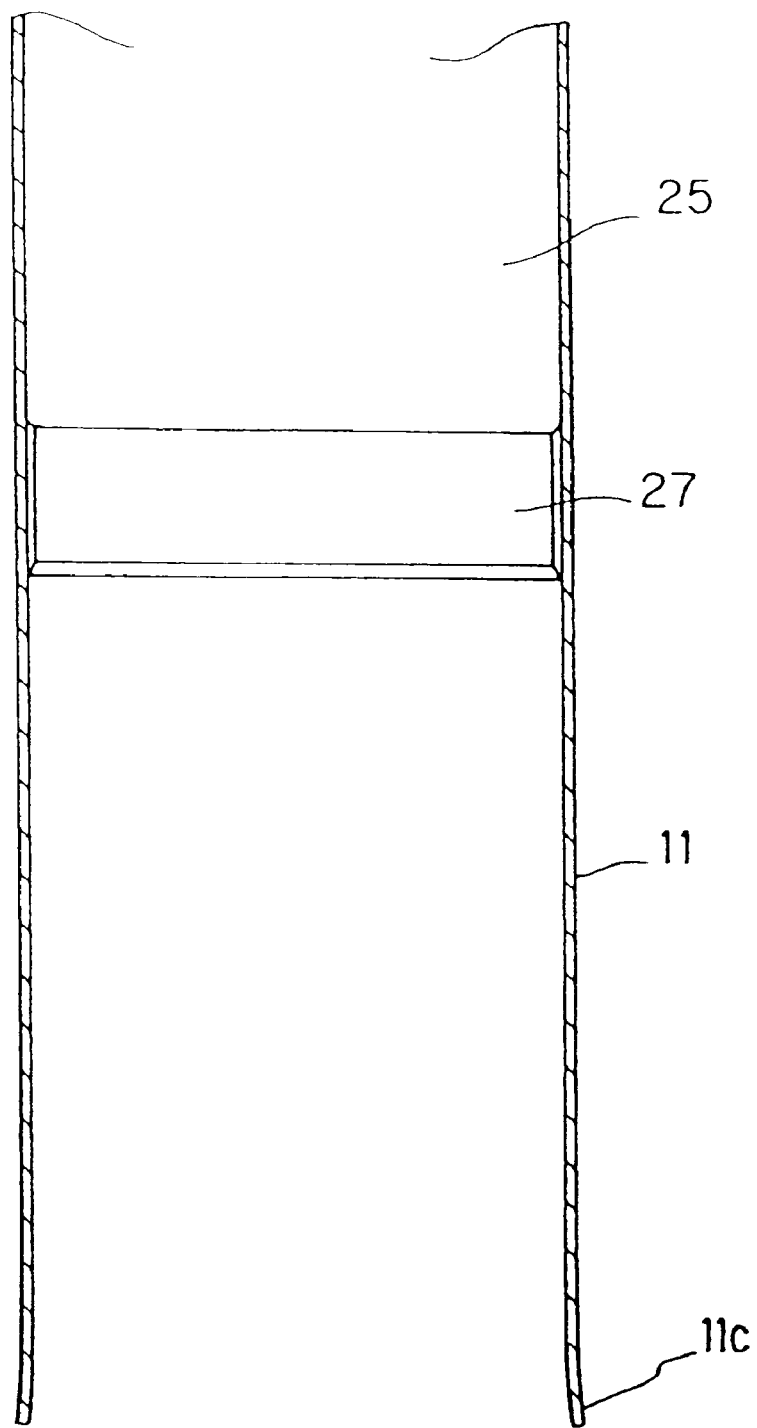
FIG. 9 is a schematic cross sectional view of the tube holder holding a thinly walled tube of a second embodiment of the invention and showing that the second step of the method is over.

As the inner wall surface is heated to the temperature higher than the melting point of the inner layer, the front end 11c of the thinly walled tube 11 is bent radially outwardly to produce the flange section as shown in FIG. 9. It is considered that since the inner wall surface is heated to the temperature higher than the melting point of the inner layer, only the inner layer is molten and flows downwardly to become suspended, whereas the outer layer that is cooled and does not melt, the inner layer is pulled and by the contracting force of the material having a low melting point, so that it is deformed outwardly. If the thinly walled tube 11 has a three-layered structure including an intermediary layer, it is preferable that the intermediary layer is made of a material having a melting point higher than that of the inner layer, and that the inner wall surface is heated to a temperature higher than the melting point of the inner layer but lower than the melting point of the intermediary layer.

Then, the outer wall surface of the front end of the thinly walled tube is heated by means of the external heater 61. As illustrated in FIG. 10, the tube holder 19 holding the thinly walled tube 11 with the outwardly bent front end 11c is moved until the front end 11c of the thinly walled tube 11 is placed inside the heating section 65 of the external heater 61. Then, hot air discharged through the hot air discharge ports 69 collides with the outer wall surface 31a of the thinly walled tube 11 to heat the the outer wall surface. The hot air that has collided with the outer wall surface 31a is then drawn away through the hot air suction path 67 as shown by arrows in FIG. 10. The hot air that has collided with the outer wall surface 31a has to be forcibly drawn away, because the portions of the thinly walled tube 11 that should be not be heated are minimally affected the heating operation.

The temperature of hot air and the duration of heating operation are so selected as to sufficiently soften the front end 11c of the thinly walled tube 11. While specific values are cited for the temperature of hot air and the duration of heating operation in Examples that will be described hereinafter, the temperature and the duration are not limited to them. However, if the heating temperature is too high, the resin would be molten. Thus, it is preferable to control the duration to control the heating operation.

The front end of the thinly walled tube is heated in an area that corresponds to the length of the flange section 5a. For example, if the thinly walled tube 15 has a diameter of 19 mm, the front end of the thinly walled tube will be heated by 3 mm, although the present invention is not limited to these values.

As a result of the heating operation, the front end 11d of the thinly walled tube is warped or bent further radially outwardly as shown in FIG. 11.

Figure 13:
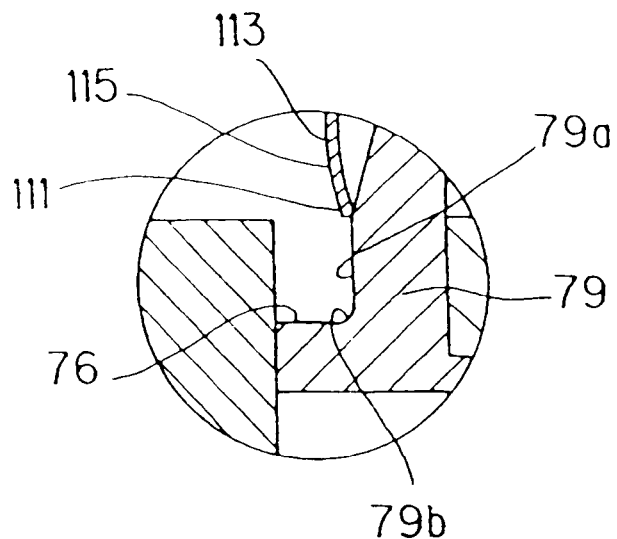
FIG. 13 is an enlarged cross sectional view of the thinly walled tube and the female mold in FIG. 12, showing only the area encircled by A.
Figure 15:
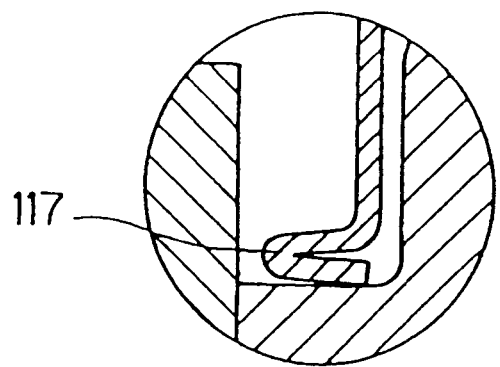
FIG. 15 is an enlarged cross sectional view of the thinly walled tube and the female mold in FIG. 14, showing only the area encircled by B.
Figure 14:
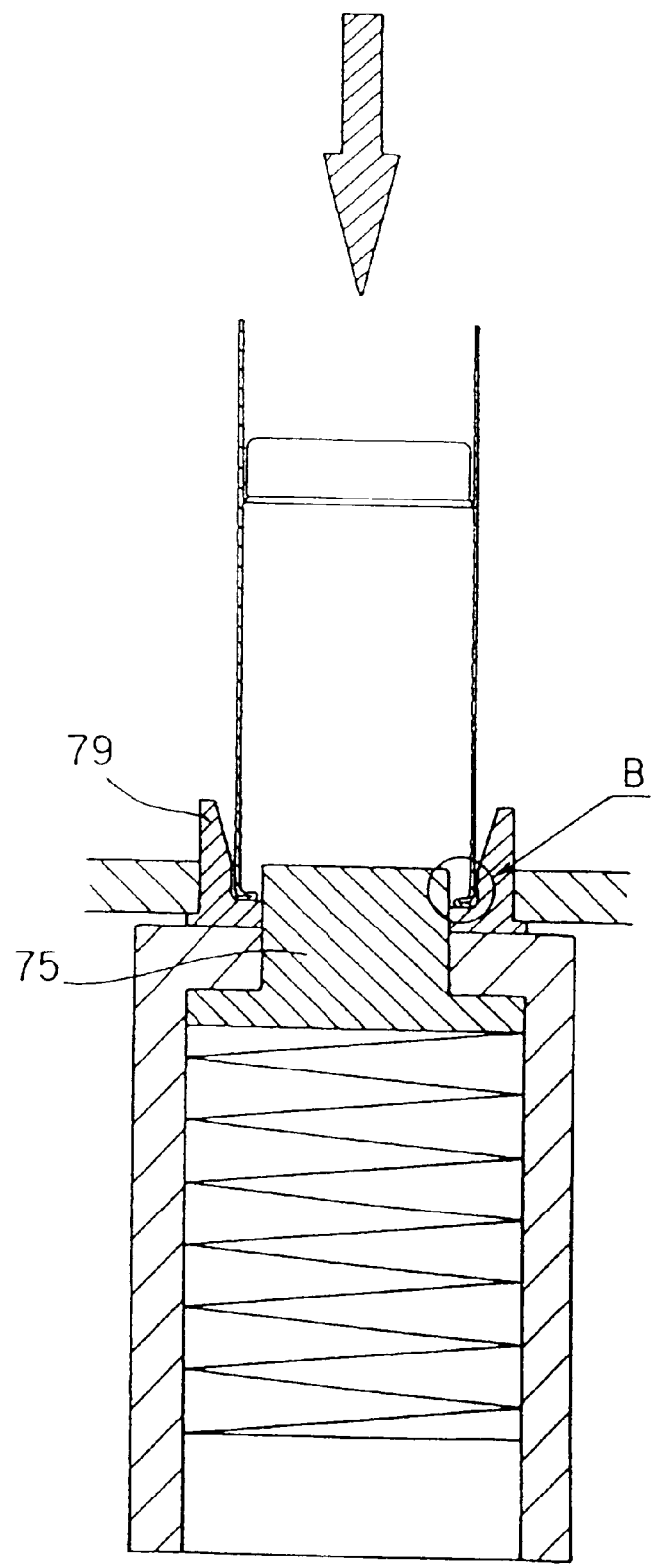
FIG. 14 is a schematic cross sectional view of the second embodiment, and showing that the flange molding step is in progress.
Figure 16:
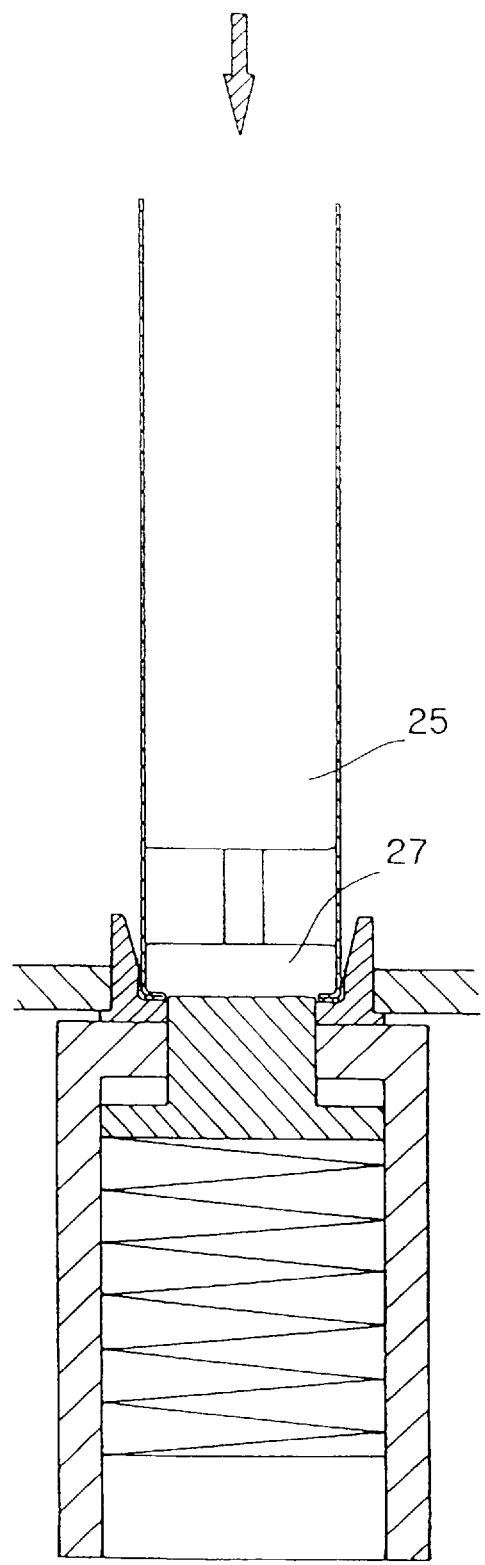
FIG. 16 is a schematic cross sectional view of the tube holder and the female mold of the second embodiment of the invention, and showing that the flange molding step of a method according to the invention is over.

Then, the tube holder 19 holding the thinly walled tube 11 with the heated front end 11d is moved to above the female mold 71 as shown in FIG. 11. Then, the tube holder 19 is moved downwardly until the front end 11d is placed in the cavity 74 of the female mold 71 (FIG. 12) and then the tube holder 19 is further moved downwardly. Referring to FIG. 13, the externally warped front end 111 is moved downwardly while it abuts the inner peripheral surface 79a of the guide wall 79. When the externally warped front end 111 reaches a L-shaped corner 79b of the inner peripheral surface 79a and the bottom surface 76 of the guide wall 79, a wall 113 of the front end 111 is bent inwardly at a bending point 115 located slightly above the front edge 111, so that the thinly walled tube 11 is eventually folded at the front end as indicated by 117 in FIG. 15. Then, the male mold 27 is moved downwardly relative to the tube holder 25 (FIG. 16). The front end of the thinly walled tube is controlled for its configuration by the peripheral wall of the opening-maintaining section 75, so that the opening 9 maintains its shape.

Then, the thus obtained upper surface, the inwardly directed end surface and the lower surface of the flange section 5a are covered by the inner layer of the thinly walled tube as illustrated in FIG. 18.

After the compression molding, the male mold 27 is moved upwardly relative to the tube holder main body 25, and then the tube holder 19 holding the thinly walled tube 11 is moved upwardly as shown in FIG. 5. Thereafter, the thinly walled tube 11 is removed out of the tube holder 19 to produce a finished tubular container la as shown in FIG. 17.

EXAMPLE 1

The thinly walled tube having a multi-layer structure of the outer layer of adhesive polyethylene, the intermediary layer 17 of ethylenevinylalcohol copolymer and the inner layer 15 of adhesive polyethylene was used. The thinly walled tube 11 showed a wall thickness of 0.5 mm.

The heater/cooler 21 was operated under the following conditions; hot air temperature: 370° C., hot air pressure: 0.08 MPa, suction power for drawing the hot air: 330 Nl/min., cooling water flow rate in the cooling section 33: 2.2 l/min., heating time: 1.0 sec., cooling section temperature: 18° C. An excellent tubular container 1 was formed under the above conditions.

The tubular container 1 prepared in this Example operated excellently for containing a highly fluid product (coffee, aromatic, etc.) when a lid (film) was applied to close the opening 9 of the flange section 5.

EXAMPLE 2

The thinly walled tube 11 having the multi-layer structure of the outer layer 13 of adhesive polyethylene, the intermediary layer 17 of ethylenevinylalcohol copolymer and the inner layer 15 of adhesive polyethylene was used. The thinly walled tube 11 showed a wall thickness of 0.5 mm.

The internal heater was operated under the following conditions; hot air temperature: 375° C., hot air flow rate: 400 Nl/min., suction power for drawing the hot air: 300 Nl/min., cooling water flow rate in the cooling section: 2.2 l/min., internal heating time: 1.0 sec.

An excellent tubular container was obtained under the above conditions.

EXAMPLE 3

The thinly walled tube 11 having the multi-layer structure of the outer layer 13 of polyethylene, the intermediary layer 17 of adhesive polyethylene and the inner layer 15 of non-adsorbing polyethylene terephthalate was used. The thinly walled tube 11 showed a wall thickness of 0.5 mm.

The internal heater was operated under the following conditions; hot air temperature: 375° C., hot air flow rate: 400 Nl/min., suction power for drawing the hot air: 300 Nl/min.; cooling water flow rate in the cooling section: 2.2 l/min.; internal heating time: 1.0 sec.

An excellent tubular container was obtained under the above conditions.

EXAMPLE 4

The thinly walled tube 11 having the multi-layer structure of the outer layer 13 of polyethylene, the intermediary layer 17 of adhesive polyethylene and an inner layer 15 of non-adsorbing polyethylene terephthalate was used. The thinly walled tube 11 showed a wall thickness of 0.5 mm.

The internal heater was operated under the following conditions; hot air temperature: 374° C., hot air flow rate: 400 Nl/min., suction power for drawing the hot air: 300 Nl/min., cooling water flow rate in the cooling section: 2.2 l/min.; internal heating time: 0.8 sec. Under such condition, the front end of the multi-layered tube 11 was bent outwardly to the flange shape.

The obtained multi-layered tube was then heated by the external heater under the following conditions; hot air temperature: 400° C., hot air flow rate: 380 Nl/min., suction power for drawing the hot air: 400 Nl/min., external heating time; 0.5 sec.

An excellent tubular container was obtained under the above conditions.

As described in detail, according to the invention, hot air is blown to the inner wall surface of the thinly walled tube at and near the front end thereof and the outer wall surface of the thinly walled tube is cooled also at and the front end thereof to produce a temperature difference between the inside and the outside of the thinly walled tube so as to deform the front end of the thinly walled tube into the flange section projecting radially. Thereafter, the radially deformed front end of the thinly walled tube is molded into the flange section that shows a predetermined shape, and the opening is formed inside the flange section by means of the female mold cooperating with said male mold as the front end of the thinly walled tube is made to abut the peripheral wall surface of the female mold. Thus, the opening is made to maintain its shape and the flange section having a desired profile can be formed quickly.

Additionally, the hot air used to heat the inner wall surface is drawn away from the thinly walled tube to prevent the area of the thinly walled tube directly connected to the flange section from being deformed by heat.

According to the first embodiment of the invention, hot air is blown to the inner wall surface at and near the end of the thinly walled tube to heat the inner wall surface to a temperature lower than the melting point of the inner layer of the tube, while the outer wall surface of the thinly walled tube is cooled at and near the end to produce a temperature difference between the inside and the outside of the thinly walled tube in the above described second step so as to deform the front end of the thinly walled tube into a flange section projecting radially inwardly. According to a second embodiment of the invention, hot air is blown to the inner wall surface at and near the end of the thinly walled tube to heat the inner wall surface to a temperature higher than the melting point of the inner layer of the tube, while the outer wall surface of the thinly walled tube is cooled at and near the end to produce a temperature difference between the inside and the outside of the thinly walled tube in the above described second step so as to deform the front end of the thinly walled tube radially outwardly and eventually produce an inwardly directed flange section.

The inwardly directed flange of a tubular container produced by the second embodiment of the invention is covered by the inner layer at the upper surface, the inwardly directed end surface and the lower surface. Thus, the gas barrier effect of the flange section is improved if the inner layer is made of resin having gas barrier property. Therefore, a tubular container produced by the second embodiment of the invention is particularly suited for containing a food product that has to be protected by a gas barrier.

I claim:

1. A method for producing a thinly walled tube of thermoplastic resin to produce a tubular container having an inwardly directed flange in a hole at an end of the thinly walled tube, comprising:

a first step of securing said thinly walled tube to a tube holder provided with a male mold, said thinly walled tube being secured such that a front end of the thinly walled tube projects by a predetermined distance from a front end of the tube holder;

a second step of blowing hot air to an inner wall surface of the thinly walled tube at and near the front end thereof and cooling an outer wall surface of the thinly walled tube also at and near the front end thereof wherein a cooling section of a heater/cooler contacts the outer wall surface to absorb heat from the outer wall surface to produce a temperature difference between an inside and an outside of the thinly walled tube;

a third step of forcibly drawing the hot air away from the front end of the thinly walled tube while blowing hot air to the inner wall surface;

a fourth step of the front end of the thinly walled tube deforming into a flange projecting radially due to the temperature difference between the inside and the outside of the thinly walled tube; and a fifth step of molding the deformed front end of the thinly walled tube into an inwardly directed flange section having an opening located inside the flange section by means of a female mold cooperating with said male mold.

2. The method for processing a thinly walled tube of thermoplastic resin to produce a tubular container according to claim 1, wherein said thinly walled tube has a three-layered structure including an outer layer, an inner layer and an intermediate layer sandwiched between the inner and outer layers, and the thermoplastic resin of the inner layer has a melting point lower than that of the thermoplastic resin of the intermediate layer.

3. A method for producing a thinly walled tube of thermoplastic resin to produce a tubular container having an inwardly directed flange in a hole at an end of the thinly walled tube, comprising:

a first step of securing said thinly walled tube to a tube holder provided with a male mold, said thinly walled tube being secured such that a front end of the thinly walled tube projects by a predetermined distance from a front end of the tube holder;

a second step of blowing hot air to an inner wall surface of the thinly walled tube at and near the front end thereof to heat the inner wall surface to a temperature lower than a melting point of the inner layer, and cooling an outer wall surface of the thinly walled tube also at and near the front end thereof wherein a cooling section of a heater/cooler contacts the outer wall surface to absorb heat from the outer wall surface to produce a temperature difference between an inside and an outside of the thinly walled tube;

a third step of forcibly drawing the hot air away from the front end of the thinly walled tube while blowing hot air to the inner wall surface;

a fourth step of the front end of the thinly walled tube deforming radially inward due to the temperature difference between the inside and the outside of the thinly walled tube and the heating of the inner surface to a temperature below the melting point of the inner surface; and a fifth step of molding the inwardly deformed front end of the thinly walled tube into an inwardly directed flange section having an opening located inside the flange section by means of a female mold cooperating with said male mold.

4. The method for processing a thinly walled tube of thermoplastic resin to produce a tubular container according to claim 3, wherein said thinly walled tube has a three-layered structure including an outer layer, an inner layer and an intermediate layer sandwiched between the inner layer and the outer layer, and the thermoplastic resin of the inner layer has a melting point lower than that of the thermoplastic resin of the intermediate layer.

5. A method for producing a thinly walled tube of thermoplastic resin to produce a tubular container having an inwardly directed flange in a hole at an end of the thinly walled tube, comprising:

a first step of securing said thinly walled tube to a tube holder provided with a male mold, said thinly walled tube being secured such that a front end of the thinly walled tube projects by a predetermined distance from a front end of the tube holder;

a second step of blowing hot air to an inner wall surface of the thinly walled tube at and near the front end thereof to heat the inner wall surface to a temperature higher than a melting point of the inner surface, and cooling an outer wall surface of the thinly walled tube also at and near the front end thereof wherein a cooling section of a heater/cooler contacts the outer wall surface to absorb heat from the outer wall surface to produce a temperature difference between an inside and an outside of the thinly walled tube;

a third step of forcibly drawing the hot air away from the front end of the thinly walled tube while blowing hot air to the inner wall surface;

a fourth step of the front end of the thinly walled tube deforming radially outward due to the temperature difference between the inside and the outside of the thinly walled tube and the heating of the inner surface to a temperature higher than the melting point of the inner surface; and a fifth step of molding the outwardly deformed front end of the thinly walled tube into an inwardly directed flange section having an opening located inside the flange section by means of a female mold cooperating with said male mold.

6. The method for processing a thinly walled tube of thermoplastic resin to produce a tubular container according to claim 5, wherein said fifth step is performed by:

blowing hot air on the outer wall surface of the thinly walled tube at the outwardly deformed front end in the second step so as to soften the outer wall surface of the thinly walled tube at the front end; and bending and folding the front end of the thinly walled tube inwardly to form the inwardly directed flange section having the opening by means of said female mold and said male mold.

7. The method for processing a thinly walled tube of thermoplastic resin to produce a tubular container according to claim 5, wherein said thinly walled tube has a three-layered structure including an outer layer, an inner layer and an intermediate layer sandwiched between the inner layer and the outer layer, and the thermoplastic resin of the inner layer has a melting point lower than that of the thermoplastic resin of the intermediate layer.

8. An apparatus for processing a thinly walled tube of thermoplastic resin to produce a tubular container having an inwardly directed flange section in a hole at an end of the thinly walled tube, comprising:

a tube holder for holding the thinly walled tube, said tube holder having a male mold to be inserted into the thinly walled tube held by it for compression molding, said male mold being arranged axially inward relative to an end of the thinly walled tube by a given distance, and axially movable;

a heater/cooler including a heating section that blows hot air to an inner wall surface of said thinly walled tube at the end thereof, and a cooling section including a cooling member surrounding the outer wall surface of the thinly walled tube at the end thereof that contacts the outer wall surface to absorb heat from the outer wall surface of the thinly walled tube to create a temperature differential between the inner wall surface and the outer wall surface; and a female mold that molds the end of the thinly walled tube to form an inwardly directed flange section in the hole of the thinly walled tube having an opening inside the flange section, said female mold cooperating with the male mold of the tube holder.

9. The apparatus for processing a thinly walled tube of thermoplastic resin according to claim 8, further comprising an external heater that blows hot air to the outer wall surface of the thinly walled tube at the end thereof.

10. The apparatus for processing a thinly walled tube according to claim 8, further comprising suction means for forcibly drawing the hot air used to heat the inner wall surface away from said tube holder.

11. The apparatus for processing a thinly walled tube according to claim 8, wherein the cooling section includes a cooling surface that contacts with the outer wall surface of the thinly walled tube and a circulating section for circulating a cooling medium contained inside to cool the cooling surface.

12. An apparatus for processing a thinly walled tube of thermoplastic resin to produce a tubular container having an inwardly directed flange section in a hole at an end of the thinly walled tube, comprising:

a tube holder for holding the thinly walled tube, said tube holder having a male mold to be inserted into the thinly walled tube held by it for compression molding, said male mold being arranged axially inward relative to an end of the thinly walled tube by a given distance, and axially movable;

a heater/cooler that blows hot air to an inner wall surface of said thinly walled tube at the end thereof, and cools the outer wall surface of the thinly walled tube; and a female mold for molding an inwardly directed flange section in the hole of the thinly walled tube having an opening inside the flange section, said female mold cooperating with the male mold of the tube holder, wherein said heater/cooler includes an annular cooling section for cooling the outer wall surface of said thinly walled tube at the end thereof, a heating section arranged inside the cooling section with an annular gap interposed therebetween, and a hot air suction path communicating with said annular gap, the end of the thinly walled tube held by said tube holder is inserted into the annular gap, and said heating section has a hot air flow path arranged in the inside thereof and hot air discharge ports disposed at positions facing the cooling section with the thinly walled tube disposed therebetween.

13. The apparatus for processing a thinly walled tube according to claim 12, wherein the hot air suction path forcibly draws the hot air used to heat the inner wall surface away from said tube holder.

* * * * *